United States Patent
Ilani et al.

(10) Patent No.: US 12,045,022 B2
(45) Date of Patent: Jul. 23, 2024

(54) PREDICTIVE CONTROL SYSTEMS AND METHODS WITH OFFLINE GAINS LEARNING AND ONLINE CONTROL

(71) Applicant: Imubit Israel Ltd., Modin (IL)

(72) Inventors: Elhanan Ilani, Jerusalem (IL); Nadav Cohen, Yavne (IL)

(73) Assignee: Imubit Israel Ltd., Modiin (IL)

( * ) Notice: Subject to any disclaimer, the term of this patent is extended or adjusted under 35 U.S.C. 154(b) by 824 days.

(21) Appl. No.: 16/950,643

(22) Filed: Nov. 17, 2020

(65) Prior Publication Data

US 2021/0096518 A1     Apr. 1, 2021

Related U.S. Application Data

(63) Continuation-in-part of application No. 15/883,114, filed on Jan. 30, 2018, now Pat. No. 11,200,489.

(51) Int. Cl.
| | |
|---|---|
| G06N 3/08 | (2023.01) |
| G05B 13/02 | (2006.01) |
| G06N 3/045 | (2023.01) |

(52) U.S. Cl.
CPC ........... *G05B 13/027* (2013.01); *G06N 3/045* (2023.01); *G06N 3/08* (2013.01)

(58) Field of Classification Search
CPC ......... G05B 13/027; G06N 3/045; G06N 3/08
USPC ........................................................ 706/25
See application file for complete search history.

(56) References Cited

U.S. PATENT DOCUMENTS

| | | | |
|---|---|---|---|
| 4,176,052 A | 11/1979 | Bruce et al. | |
| 4,374,021 A | 2/1983 | Bartholic | |
| 5,311,421 A | 5/1994 | Nomura et al. | |
| 5,825,646 A * | 10/1998 | Keeler ............... | G05B 13/0285 |
| | | | 700/48 |

(Continued)

FOREIGN PATENT DOCUMENTS

| | | |
|---|---|---|
| SU | 844626 A1 | 7/1981 |
| WO | WO-2021/025841 A1 | 2/2021 |

OTHER PUBLICATIONS

Yu, et al., "Implementation of neural network predictive control to a multivariable chemical reactor", Control Engineering Practice 11 (2003) 1315-1323 (Year: 2003).*

(Continued)

*Primary Examiner* — Tsu-Chang Lee
(74) *Attorney, Agent, or Firm* — Foley & Lardner LLP

(57) ABSTRACT

A controller for a plant that exhibits nonlinear dynamics includes one or more processors and memory storing instructions that cause the one or more processors to perform operations. The operations include training a neural network model during an offline learning period using historical plant data representing a plurality of different historical states of the plant and using the neural network model during online operation of the plant to generate a linear predictor as a function of a current state of the plant, the linear predictor defining a linearization of the nonlinear dynamics localized at the current state of the plant. The controller controls equipment that operate to affect the current state of the plant by performing a predictive control process that uses the linear predictor to generate values of one or more manipulated variables provided as inputs to the equipment.

20 Claims, 11 Drawing Sheets

(56) References Cited

U.S. PATENT DOCUMENTS

| | | | |
|---|---|---|---|
| 6,246,972 B1* | 6/2001 | Klimasauskas | G05B 13/0275 |
| | | | 703/2 |
| 7,720,641 B2 | 5/2010 | Alagappan et al. | |
| 9,690,312 B2 | 6/2017 | Steven et al. | |
| 2002/0059202 A1 | 5/2002 | Hadzikadic et al. | |
| 2003/0108244 A1 | 6/2003 | Li et al. | |
| 2006/0178762 A1* | 8/2006 | Wroblewski | G05B 13/027 |
| | | | 700/36 |
| 2007/0156288 A1 | 7/2007 | Wroblewski et al. | |
| 2007/0168328 A1 | 7/2007 | Peralta et al. | |
| 2010/0050025 A1* | 2/2010 | Grichnik | G05B 17/02 |
| | | | 714/E11.2 |
| 2012/0053762 A1 | 3/2012 | Stiefenhofer et al. | |
| 2015/0094201 A1 | 4/2015 | Janssen et al. | |
| 2015/0185717 A1 | 7/2015 | Sayyar-Rodsari et al. | |
| 2015/0379429 A1 | 12/2015 | Lee et al. | |
| 2016/0048113 A1 | 2/2016 | Pandurangan et al. | |
| 2016/0258361 A1 | 9/2016 | Tiwari et al. | |
| 2017/0061249 A1 | 3/2017 | Estrada et al. | |
| 2017/0139423 A1 | 5/2017 | El Ferik et al. | |
| 2017/0183573 A1 | 6/2017 | Arora et al. | |
| 2018/0016503 A1 | 1/2018 | Prasad et al. | |
| 2018/0275692 A1 | 9/2018 | Lattanzio et al. | |
| 2019/0236447 A1 | 8/2019 | Cohen et al. | |
| 2020/0074486 A1 | 3/2020 | Motohashi et al. | |
| 2020/0311547 A1 | 10/2020 | Mukund et al. | |
| 2020/0355391 A1 | 11/2020 | Wenzel et al. | |
| 2021/0096518 A1 | 4/2021 | Ilani et al. | |
| 2021/0253956 A1 | 8/2021 | Jagnanan et al. | |
| 2021/0348066 A1 | 11/2021 | Clark et al. | |

OTHER PUBLICATIONS

International Search Report and Written Opinion issued in PCT/US2022/024645 dated Jul. 1, 2022.

Lawrynczuk, "Predictive Control of a Distillation Column Using a Control-Oriented Neural Model," ICANNGA, 2011, part 1, pp. 230-239.

Lawrynczuk, "Neural Dynamic Matrix Control Algorithm with Disturbance Compensation," IEA/AIE, 2010, part 3, pp. 52-61.

International Search Report and Written Opinion on PCT/IB2021/057421 dated Nov. 4, 2021.

International Search Report and Written Opinion issued on PCT/US2021/030723 dated Jul. 28, 2021.

Nguyen et al., "Multiple neural networks for a long term time series forecast", Neural Computing & Applic (2004) 13:90-98 (Year: 2004).

International Search Report and Written Opinion issued in PCT/US2022/015474 dated May 12, 2022.

International Search Report and Written Opinion on PCT/US23/22036 dated Aug. 4, 2023.

Chang A I et al: "Advanced control project stabilizes delayed coker, increases throughput", Oil and Gas Journal, Pennwell, Houston, TX, US vol. 99, No. 34 Aug. 20, 2001 (Aug. 20, 2001), pp. 52-56.

Extended European Search Report issued in EP application No. 21813354.4 dated Nov. 20, 2023.

Zahedi Gholamreza et al: A Neural Network Approach for Identification and Modeling of Delayed Coking Plant:, International Journal of Chemical Reactor Engineering, [Online] vol. 7, No. 1, May 6, 2009.

* cited by examiner

PREDICTIVE CONTROL SYSTEMS AND METHODS WITH OFFLINE GAINS LEARNING AND ONLINE CONTROL

CROSS-REFERENCE TO RELATED PATENT APPLICATION

This application is a continuation-in-part of U.S. patent application Ser. No. 15/883,114 filed Jan. 30, 2018, the entire disclosure of which is incorporated by reference herein.

BACKGROUND

The present disclosure relates generally to control systems and more particularly to control systems that train a neural network offline and use the neural network for online control.

Neural networks are a type of artificial intelligence that are generally inspired by biological neural networks. Neural networks can include a collection of connected nodes, wherein the connections of the nodes are modeled as weights. The inputs to a neural network may be modified by these weights and summed, producing an output layer that indicates a particular prediction or determination. Adjustment of the weights effects the output layer of the neural network, thus affecting its learning process.

Neural network-based control systems can be used to monitor and control a wide variety of systems and processes including, for example, a petroleum refinery system, a natural gas processing plant, a liquefied natural gas (LNG) production facility, an olefin manufacturing plant, a commodity chemical manufacturing plant, a polymer production system, a renewable fuel production facility, an ammonia complex processing system, and many other types industrial, production, or processing systems. Training a neural network typically includes applying a set of training data that represents the behavior of the system to the neural network and tuning the neural network to predict the system behavior reflected by the training data. However, it can be challenging to properly train and apply a neural network to a dynamic system that behaves differently at different points in time.

SUMMARY

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

One implementation of the present disclosure is a controller for a plant that exhibits nonlinear dynamics. The controller includes one or more processing circuits including one or more processors and memory storing instructions that, when executed by the one or more processors, cause the one or more processors to perform operations. The operations include training a neural network model during an offline learning period using historical plant data representing a plurality of different historical states of the plant. The operations further include using the neural network model during online operation of the plant to generate a linear predictor as a function of a current state of the plant, the linear predictor defining a linearization of the nonlinear dynamics localized at the current state of the plant. The operations further include controlling equipment that operate to affect the current state of the plant by performing a predictive control process that uses the linear predictor to generate values of one or more manipulated variables provided as inputs to the equipment.

In some embodiments, training the neural network model includes generating a plurality of instances of the linear predictor as outputs of the neural network model, each instance of the linear predictor corresponding to one of the different historical states of the plant and defining a different linearization of the nonlinear dynamics localized at the corresponding historical state of the plant. In some embodiments, training the neural network further includes using the plurality of instances of the linear predictor to generate predicted values of one or more controlled variables as a function of historical values of one or more manipulated variables defined by the historical plant data. In some embodiments, training the neural network further includes adjusting weights of the neural network model to reduce an error between the predicted values of the one or more controlled variables and historical values of the one or more controlled variables defined by the historical plant data.

In some embodiments, the current state of the plant includes at least one of the one or more manipulated variables provided as inputs to the equipment, one or more controlled variables affected by operating the equipment, or one or more disturbance variables that affect the one or more controlled variables but are not directly controlled.

In some embodiments, performing the predictive control process includes using the linear predictor to generate an optimization constraint that defines a relationship between the one or more manipulated variables and one or more controlled variables affected by operating the equipment. In some embodiments, performing the predictive control process further includes performing an optimization of an objective function subject to the optimization constraint to generate the values of the one or more manipulated variables as an output of the optimization.

In some embodiments, performing the predictive control process includes using the linear predictor to train a second neural network model that determines the values of the one or more manipulated variables as a function of the current state of the plant, providing the current state of the plant as an input to the second neural network model, and generating the values of the one or more manipulated variables as an output of the second neural network model to optimize an objective function.

In some embodiments, using the linear predictor to train the second neural network model includes using the second neural network model to generate determined values of the one or more manipulated variables as a function of a historical state of the plant defined by the historical plant data, using the linear predictor to predict values of one or more controlled variables affected by operating the equipment as a function of the determined values of the one or more manipulated variables, and adjusting weights of the second neural network model to optimize the objective function, wherein the second neural network model outputs the one or more manipulated variables based on the objective function.

In some embodiments, the values of the one or more manipulated variables include at least one of time series values comprising a value for each of the one or more manipulated variables at each of a plurality of time steps, or step values indicating amounts by which each of the one or more manipulated variables changes between time steps.

In some embodiments, the operations further include generating a plurality of instances of the linear predictor as outputs of the neural network model, each instance of the linear predictor corresponding to one of the different historical states of the plant and defining a different linearization of the nonlinear dynamics localized at the corresponding historical state of the plant. The operations further include using the plurality of instances of the linear predictor to train a second neural network model that determines the values of the one or more manipulated variables as a function of the current state of the plant. The operations further include providing the current state of the plant as an input to the second neural network model. The operations further include generating the values of the one or more manipulated variables as an output of the second neural network model to optimize an objective function.

Another implementation of the present disclosure is a method for controlling a plant that exhibits nonlinear dynamics. The method includes training a neural network model during an offline learning period using historical plant data representing a plurality of different historical states of the plant. The method further includes using the neural network model during online operation of the plant to generate a linear predictor as a function of a current state of the plant, the linear predictor defining a linearization of the nonlinear dynamics localized at the current state of the plant. The method further includes controlling equipment that operate to affect the current state of the plant by performing a predictive control process that uses the linear predictor to generate values of one or more manipulated variables provided as inputs to the equipment.

In some embodiments, training the neural network model includes generating a plurality of instances of the linear predictor as outputs of the neural network model, each instance of the linear predictor corresponding to one of the different historical states of the plant and defining a different linearization of the nonlinear dynamics localized at the corresponding historical state of the plant. Training the neural network model further includes using the plurality of instances of the linear predictor to generate predicted values of one or more controlled variables as a function of historical values of one or more manipulated variables defined by the historical plant data. Training the neural network model further includes adjusting weights of the neural network model to reduce an error between the predicted values of the one or more controlled variables and historical values of the one or more controlled variables defined by the historical plant data.

In some embodiments, the current state of the plant includes at least one of the one or more manipulated variables provided as inputs to the equipment, one or more controlled variables affected by operating the equipment, or one or more disturbance variables that affect the one or more controlled variables but are not directly controlled.

In some embodiments, performing the predictive control process includes using the linear predictor to generate an optimization constraint that defines a relationship between the one or more manipulated variables and one or more controlled variables affected by operating the equipment and performing an optimization of an objective function subject to the optimization constraint to generate the values of the one or more manipulated variables as an output of the optimization.

In some embodiments, performing the predictive control process includes using the linear predictor to train a second neural network model that determines the values of the one or more manipulated variables as a function of the current state of the plant, providing the current state of the plant as an input to the second neural network model, and generating the values of the one or more manipulated variables as an output of the second neural network model to optimize an objective function.

In some embodiments, using the linear predictor to train the second neural network model includes using the second neural network model to generate determined values of the one or more manipulated variables as a function of a historical state of the plant defined by the historical plant data. Using the linear predictor to train the second neural network model further includes using the linear predictor to predict values of one or more controlled variables affected by operating the equipment as a function of the determined values of the one or more manipulated variables and adjusting weights of the second neural network model to optimize the objective function, wherein the second neural network model outputs the one or more manipulated variables based on the objective function.

In some embodiments, the values of the one or more manipulated variables include at least one of time series values comprising a value for each of the one or more manipulated variables at each of a plurality of time steps or step values indicating amounts by which each of the one or more manipulated variables changes between time steps.

In some embodiments, the method further includes generating a plurality of instances of the linear predictor as outputs of the neural network model, each instance of the linear predictor corresponding to one of the different historical states of the plant and defining a different linearization of the nonlinear dynamics localized at the corresponding historical state of the plant. The method further includes using the plurality of instances of the linear predictor to train a second neural network model that determines the values of the one or more manipulated variables as a function of the current state of the plant. The method further includes providing the current state of the plant as an input to the second neural network model. The operations further include generating the values of the one or more manipulated variables as an output of the second neural network model to optimize an objective function.

Another implementation of the present disclosure is a method for controlling a plant that exhibits nonlinear dynamics. The method includes obtaining a current state of the plant comprising values of one or more variables monitored or controlled by the plant. The method further includes using a neural network model to generate a linear predictor as a function of the current state of the plant, the linear predictor defining a linearization of the nonlinear dynamics localized at the current state of the plant. The method further includes performing a predictive control process using the linear predictor to generate values of one or more manipulated variables. The method further includes controlling equipment that operate to affect the current state of the plant by providing the values of the one or more manipulated variables as inputs to the equipment.

In some embodiments, the current state of the plant includes at least one of the one or more manipulated variables provided as inputs to the equipment, one or more controlled variables affected by operating the equipment, one or more disturbance variables that affect the one or more controlled variables but are not directly controlled.

In some embodiments, the values of the one or more manipulated variables include at least one of time series values comprising a value for each of the one or more manipulated variables at each of a plurality of time steps or step values indicating amounts by which each of the one or more manipulated variables changes between time steps.

In some embodiments, performing the predictive control process includes using the linear predictor to generate an optimization constraint that defines a relationship between the one or more manipulated variables and one or more controlled variables affected by operating the equipment and performing an optimization of an objective function subject to the optimization constraint to generate the values of the one or more manipulated variables as an output of the optimization.

In some embodiments, performing the predictive control process includes using the linear predictor to train a second neural network model that determines the values of the one or more manipulated variables as a function of the current state of the plant, providing the current state of the plant as an input to the second neural network model, and generating the values of the one or more manipulated variables as an output of the second neural network model to optimize an objective function.

In some embodiments, the method further includes training the neural network model by providing historical plant data representing a historical state of the plant as inputs to the neural network model, generating an instance of the linear predictor as an output of the neural network model, using the instance of the linear predictor to generate predicted values of one or more controlled variables as a function of historical values of one or more manipulated variables defined by the historical plant data, and adjusting weights of the neural network model to reduce an error between the predicted values of the one or more controlled variables and historical values of the one or more controlled variables defined by the historical plant data.

In some embodiments, training the neural network model includes repeating the providing and generating steps of training the neural network model for each of a plurality of historical states of the plant to generate a plurality of different instances of the linear predictor, each instance of the linear predictor corresponding to a different historical state of the plant. Training the neural network model further includes repeating the using step of training the neural network model for each of the plurality of different instances of the linear predictor to generate a plurality of different sets of the predicted values of the controlled variables, each set of predicted values of the controlled variables corresponding to one of the different historical states of the plant. In some embodiments, adjusting the weights of the neural network model includes reducing an aggregate error between the plurality of different sets of the predicted values of the controlled variables and corresponding historical values of the controlled variables defined by the historical plant data.

In some embodiments, the historical values of the one or more manipulated variables comprise historical step values indicating amounts by which each of the one or more manipulated variables changed between time steps in the historical plant data. In some embodiments, the historical values of the one or more controlled variables comprise historical step values indicating amounts by which each of the one or more controlled variables changed between time steps in the historical plant data. In some embodiments, the predicted values of the one or more controlled variables comprise predicted step values indicating amounts by which each of the one or more controlled variables is predicted to change between time steps as a function of the historical step values of the one or more manipulated variables.

In some embodiments, the method further includes generating a plurality of instances of the linear predictor as outputs of the neural network model, each instance of the linear predictor corresponding to one of the different historical states of the plant and defining a different linearization of the nonlinear dynamics localized at the corresponding historical state of the plant. The method further includes using the plurality of instances of the linear predictor to train a second neural network model that determines the values of the one or more manipulated variables as a function of the current state of the plant. The method further includes providing the current state of the plant as an input to the second neural network model. The operations further include generating the values of the one or more manipulated variables as an output of the second neural network model to optimize an objective function.

DETAILED DESCRIPTION

Overview

Figure 1:
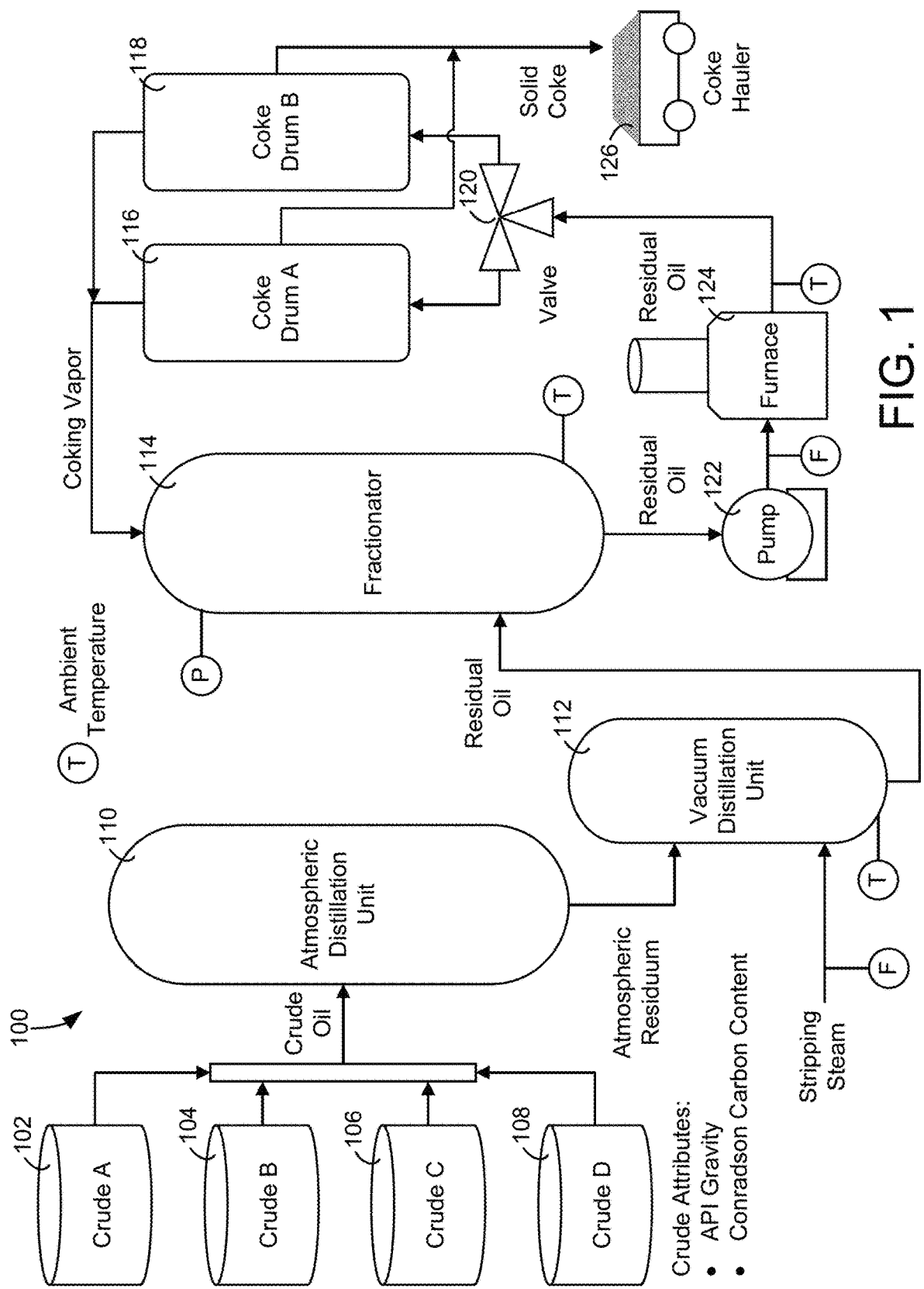
FIG. 1 is a diagram of a petroleum refinery system, according to some embodiments.

Referring generally to the FIGURES, predictive control schemes using offline learning and online control are shown, according to exemplary embodiments. Many different types of systems require control/automation but do not exhibit linear behavior, including chemical processes, a petroleum refinery system, a natural gas processing plant, a liquefied natural gas (LNG) production facility, an olefin manufacturing plant, a commodity chemical manufacturing plant, a polymer production system, a renewable fuel production facility, an ammonia complex processing system, and many other types industrial, production, or processing systems. Petroleum refining systems are one example of a type of system that may exhibit non-linear behavior. A plant, in control theory and as generally referred to herein, is the combination of a process and one or more mechanically-controlled outputs.

Non-linear behavior may be the result of underlying system dynamics that are inherently non-linear or may be the result of the system transitioning across different linear or non-linear operating regions at different stages of the process. A control schema that accounts for the non-linear behavior by reducing the effects of non-linearity and training the control schema via one or more neural networks is advantageous. Once the neural network(s) is trained, the control schema may be implemented using model predictive control (MPC), neural network process control (NNPC), or a combination of both.

In some embodiments, the systems and methods described herein use a neural network model to generate a linear gains matrix that is specific to a given state of the system. When training the neural network, the "state" (S) can be defined as a historical window of manipulated variables (MV's), disturbance variables (DV's) and control variables (CV's). For each controlled variable to be predicted, a gains matrix that depends on the state can be generated using the neural network model. In other words, the state (S) can be provided as an input to the neural network model and the gains matrix (A) can be generated as an output of the neural network model as shown in the following equation:

$$A = NN(S)$$

where A is the gains matrix, S is the state of the historical data, and NN represents the neural network model. The gains matrix A may include any number of rows and columns. In some embodiments, the gains matrix A holds coefficients of a linear function whose inputs are steps (e.g., the value at time t minus the value at a previous time, etc.) of the MV's, DV's and CV's and whose outputs are the expected resulting step in the predicted CV. In a general embodiment, a neural network (e.g., neural network model, etc.) is trained by iteratively taking episodes from received historical data, predicting the gains matrix A based on the state information S, using the gains matrix A to predict the CV values, evaluating the accuracy of A by comparing the predicted CV values to the actual CV values from the historical data, and adjusting the weights of the neural network to improve the accuracy of the gains matrix A.

Once the neural network has been adequately trained, the neural network is ready for online control. During online control, a new gains matrix (A) is generated by providing current state information S into the neural network. In some embodiments, a model predictive controller receives A as an output of the neural network and uses A to execute a model predictive control (MPC) process to generate values of the MV's for the next time step. For example, the new gains matrix A can be used to formulate one or more constraints that represent the dynamics of the system at the current state S (i.e., a linear approximation of the system's non-linear dynamics localized to the current state S). The MPC process may use the constraints in combination with an objective function to formulate an optimization problem. The MPC process may then perform an optimization of the objective function, subject to the constraints, over a given time period to generate updated values of the MV's for the next time step and provide the updated values of the MV's to controllable equipment as control instructions. Advantageously, the newly adapted MPC scheme is better suited for a non-linear system using the learned gains matrix from the neural network.

In other embodiments, standard MPC control is not used and instead a local NNPC controller (i.e., machine learning controller (MLC)) is used to generate the updated values of the MV's based on A. The NNPC controller may use a second neural network to generate the updated values of the MVs as a function of the current gains matrix A and the state of the plant. In some embodiments, the NNPC controller incorporates the current state values and/or dynamic control signals (e.g., prices, etc.) to generate the updated values of the MVs. The NNPC controller can be a local NNPC controller that can be applied to a single operating regime (e.g., a local linearization represented by a single gains matrix) or a global NNPC controller that can be applied to all operating regimes (e.g., across multiple different linear operating regimes represented by multiple different gains matrices). These and other features of the predictive control systems and methods are described in greater detail below.

Before discussing the features of the predictive control systems and methods in detail, it is noted that these predictive control systems and methods can be applied to a wide variety of different types of controllable systems and processes. Several non-limiting examples of potential implementations include a petroleum refinery system, a natural gas processing plant, a liquefied natural gas (LNG) production facility, an olefin manufacturing plant, a commodity chemical manufacturing plant, a polymer production system, a renewable fuel production facility, an ammonia complex processing system, and many other types industrial, production, or processing systems. To facilitate the explanation and comprehension of the features described herein, the present disclosure will describe the predictive control systems and methods primarily in the context of an oil or petroleum refinery process, as shown in FIG. 1. However, it should be understood that this is merely one example of a wide variety of potential implementations and should not be regarded as limiting.

Oil Refinery Process Overview

Referring now to FIG. 1, a system 100 for refining petroleum to transform crude oil (or other crude petroleum products) into more useful products (e.g., gasoline, petrol, kerosene, etc.) is shown, according to exemplary embodiments. FIG. 1 depicts a general system for refining crude oil, but systems including other refinery tools (e.g., a de-salter for the crude oil, hydrocrackers, hydrotreaters, etc.), different configurations of system 100 that include the same components, more or less drums and/or storage containers, and other modifications to system 100 can be considered. System 100 is shown to include crude oil storage tanks (e.g., "oil tanks") 102-108, atmospheric distillation unit (ADU) 110, vacuum distillation unit (VDU) 112, fractionator 114, coke drums 116,118, valves 120, pump 122, furnace 124, and coke hauler 126.

Before describing the components of system 100 in detail, it is noted that although system 100 is described primarily as refining oil, it should be understood that the systems and methods described herein can be used to refine or produce any of a variety of petroleum products. For example, system 100 can be operated to produce butane, methane, diesel fuel, fuel oil, gasoline, kerosene, liquefied natural gas, liquefied petroleum gas, propane, microcrystalline wax, napalm, naphtha, naphthalene, paraffin wax, petroleum jelly, petroleum wax, refined asphalt, refined bitumen, refined petroleum gas, slack wax, sulfur, petroleum coke, petrochemicals, or any other type of petroleum product. In general, system 100 may be configured to convert one or more input petroleum products into one or more output or derived petroleum products. Although system 100 is described primarily as producing petroleum coke (referred to herein as "coke") as the derived petroleum product, it should be understood that the systems and methods described herein can be applied to any type of petroleum product without departing from the teachings of the present disclosure.

Oil tanks 102-108 may represent the mechanical components and/or methods for storing and providing petroleum into system 100. As disclosed herein, the terms "petroleum" and "crude oil" may be used interchangeably when referring to the mixture of hydrocarbons received prior to oil refining. In some embodiments, the oil stored in oil tanks 102-108 has an American Petroleum Institute (API) gravity of 15-45 degrees, wherein a high API indicates a lower density crude oil and a low API indicates a higher density crude oil. In some embodiments, the oil stored in oil tanks 102-108 has a lower or higher API gravity. In some embodiments, the level of concarbon content (CCR) (e.g., Conradson carbon residue, etc.) is measured to provide an indication of the coke-forming tendencies of the crude oil, prior to providing crude oil to system 100 via oil tanks 102-108. The crude oil stored in oil tanks 102-108 may be recovered through various forms of oil drilling and/or natural petroleum springs. A pumping system may then transfer the received crude oil to store in oil tanks 102-108 and provide the crude oil into atmospheric distillation unit 110.

ADU 110 may be configured to superheat the received crude oil to temperatures that separate the crude oil into its various naturally-occurring components, such as gasoline, kerosene, diesel, fuel oil, and residual oil. While FIG. 1 shows a single atmospheric distillation unit, system 100 may include any number of atmospheric and/or vacuum distillation units for refining the crude oil. Additionally, the crude oil may be preheated (e.g., by a furnace, by one or more tube-still heaters, etc.) such that the crude oil enters ADU 110 at a temperature where some or most of the crude oil is already vaporized. For example, crude oil may be preheated to a temperature of 250-260° C. The oil then enters a tube-still heater to reach a temperature of 350-360° C., where it is then fed into ADU 110. Upon entering ADU 110, the crude oil is further heated to increase vaporization of the crude oil. The vapor rises within ADU 110 and separates to fractions (e.g., subcomponents, layers, levels, etc.). These fractions may be determined by the temperature at which the vapor phase changes back into a liquid. As such, once the vapor reaches an appropriate fraction layer, the vapor changes back into a liquid and is successfully separated into a distillate of the crude oil. Various distillates may be produced via ADU 110, including light distillates (e.g., liquid petroleum gasoline (LPG), gasoline, naphtha, etc.), middle distillates (e.g., kerosene, jet fuel, diesel, etc.), heavy distillates (e.g., fuel oil, etc.), and residuum (e.g., heavy fuel oil, lubricating oils, vax, asphalt, etc.). In a general embodiment, light distillates may have a boiling point around 150-200° C., middle distillates may have a boiling point around 250-300° C., heavy distillates may have a boiling point around 300-350° C., and residuum may have a boiling point around 350° C. and above. The processes performed by ADU 110 may be referred to a fractional distillation or fractionation. ADU 110 is shown providing the distilled residuum to VDU 112 for further distillation.

VDU 112 may act as another process for distilling petroleum products in a heated container. As shown in FIG. 1, the crude oil residuum is provided to VDU 112 for further distillation. System 100 further shows stripping steam entering VDU 112, which may be included in the distillation process. The stripping steam may be controlled based on flow measurements taken by flow sensors, prior the stripping steam entering VDU 112. VDU 112 may perform vacuum distillation, a process similar to ADU 110, but in a vacuum or close to a vacuum (e.g., 10 mmHg, 20 mmHg, etc.). This process for distilling crude oils may help to produce petroleum products from heavier oils left over from atmospheric distillation, as the low pressure in the vacuum decreases the boiling point for the petroleum products in the crude oil. VDU 112 may produce similar distillates as ADU 110 and decrease the overall residuum left over after distillation. However, residuum from the vacuum distillation of VDU 112 may still be present, and is sent to fractionator 114 for further processing.

Fractionator 114 (in combination with pump 122, furnace 124, and drums 116,118) may be configured to act as a coking system and convert the residual oil from VDU 112 into more distillates, such as hydrocarbon gases, naphtha, gas oils, and coke. Fractionator 114 may be similar to ADU 110 in that it separates the feed (e.g., received crude oil) and separates the feed into various distillates using heat. In a general embodiment, fractionator 114, coke drums 116,118, valves 120, pump 122, and furnace 124 are all part of a coker system (e.g., coker process, coker unit, etc.) configured to process the residual oil received in fractionator 114.

For example, residual oil enters fractionator 114 via VDU 112. Pumping the incoming residual oil into the bottom of fractionator 114, rather than directly into furnace 124, preheats the residual oil by having it contact hot vapors (e.g., coking vapor, gas oil vapors, etc.) in the bottom of fractionator 114. Additionally, some of the hot vapors may condense into a high-boiling liquid, recycling back into furnace 124 along with the heated residual oil. The temperature inside of fractionator 114 may be measured by one or more temperature sensors, as shown in FIG. 1.

The residual oil is then pumped through pump 122 to furnace 124. Here, the residual oil is heated to a cracking temperature (e.g., 480° C.) at which the long hydrocarbon molecules of the residual oil break, converting the residual oil into lighter components (e.g., gas oil, etc.) and petroleum coke. To mitigate deposition of coke within piping to coke drums 116,118, steam may be injected into fractionator 114 along with the residual oil (not shown in FIG. 1). Cracking continues to occur in coke drums 116,118 as gas oil and other distillates turn into vapor and return to fractionator 114. The solid coke is deposited into coke drum 116 via operation of valve 120. Once coke drum 116 is filled (e.g., reached its intended fill point, reached a drum outage target of zero, etc.), coke drum 118 is opened and coke drum 116 is closed. The heated residual oil from furnace 124 is routed to the second drum (coke drum 118). While filling coke drum 118, coke drum 116 is steamed out (e.g., forcibly injected with steam) to lower the hydrocarbon content within the coke. Once one or more coke drums are filled, the coke is discharged from the drums and hauled away via coke hauler 126.

As disclosed herein, coke may refer to any raw petroleum coke (e.g., green coke) produced in a coker (e.g., a delayed coker, a non-delayed coker, etc.). The coke may include any combination of components including carbon, hydrogen, nitrogen, sulfur, and ash. Additionally, the coke may include any combination of metals, including aluminum, boron, calcium, chromium, cobalt, iron, manganese, magnesium, molybdenum, nickel, potassium, silicon, sodium, titanium, and vanadium. In a general embodiment, the coke is mostly carbon byproducts from the heavy distillates produced in ADU 110.

System Controller—Offline Learning

Figure 2:
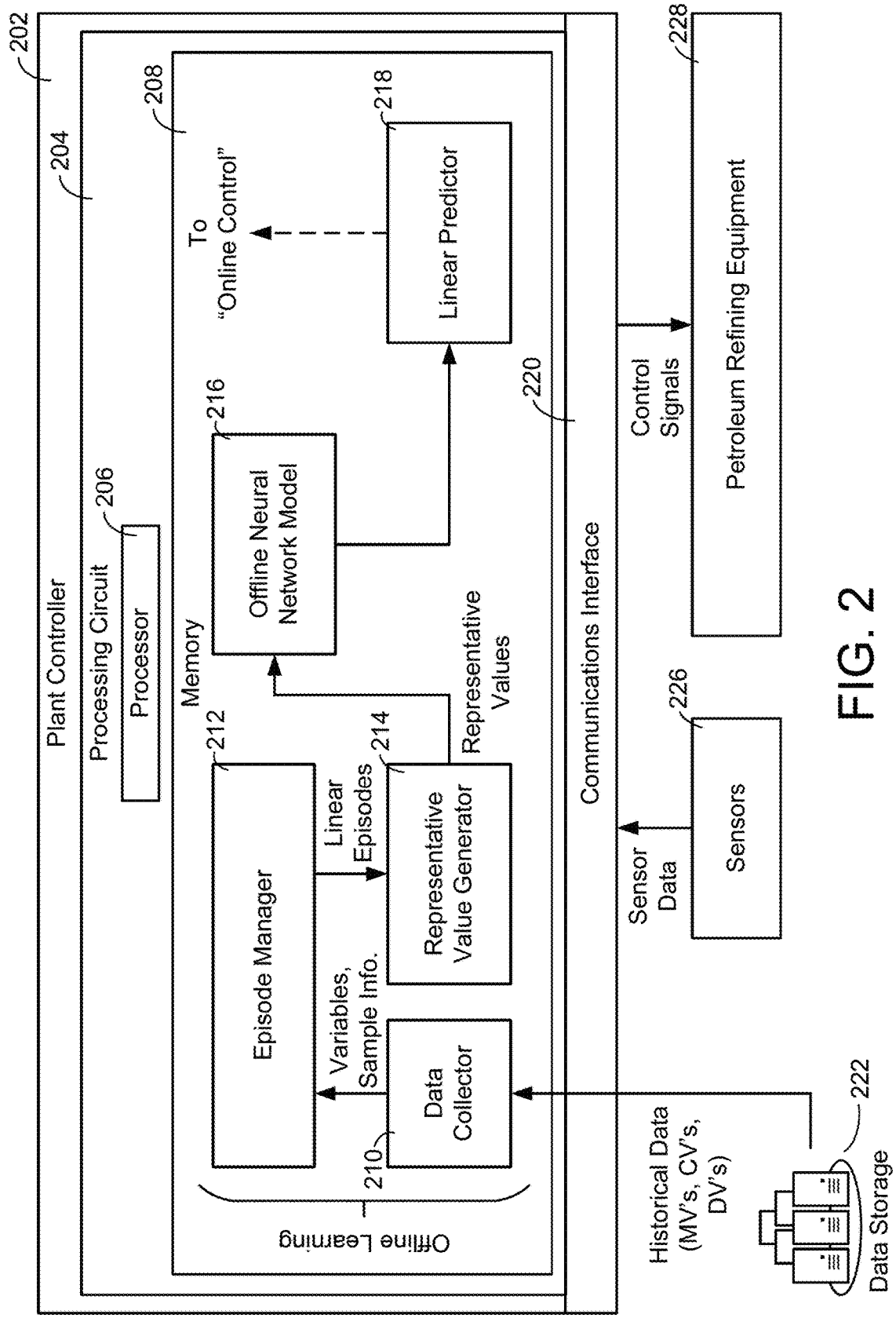
FIG. 2 is a block diagram of a controller with offline learning functionality which can be implemented in the petroleum refinery system of FIG. 1, according to some embodiments.

Referring now to FIG. 2, a system 200 for controlling at least part of system 100 is shown, according to an exemplary embodiment. System 200 includes a plant controller 202, data storage 204, sensors 206, and petroleum refining equipment 208. In some embodiments, plant controller 202 uses a trained neural network to make control decisions for system 100. As shown in FIG. 2, plant controller 202 receives historical data and input data from sensors, trains offline neural network model 216 prior to implementing online control of system 100. As shown in other figures, (e.g., FIG. 4, FIG. 5, etc.), online control is subsequently implemented to control system 100 in real time.

Plant controller 202 is shown to include communications interface 220 and processing circuit 204 including processor 206 and memory 208. Processing circuit 204 can be communicably connected to communications interface 220 such that processing circuit 204 and the various components thereof can send and receive data via communications interface 220. Processor 206 can be implemented as a general purpose processor, an application specific integrated circuit (ASIC), one or more field programmable gate arrays (FPGAs), a group of processing components, or other suitable electronic processing components.

Communications interface 220 can be or include wired or wireless communications interfaces (e.g., jacks, antennas, transmitters, receivers, transceivers, wire terminals, etc.) for conducting data communications with building subsystems 428 or other external systems or devices. In various embodiments, communications via communications interface 220 can be direct (e.g., local wired or wireless communications) or via a communications network (e.g., a WAN, the Internet, a cellular network, etc.). For example, communications interface can include an Ethernet card and port for sending and receiving data via an Ethernet-based communications link or network. In another example, communications interface 220 can include a Wi-Fi transceiver for communicating via a wireless communications network. In another example, communications interface 220 can include cellular or mobile phone communications transceivers.

Memory 208 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present disclosure. Memory 408 can be or include volatile memory or non-volatile memory. Memory 208 can include database components, object code components, script components, or any other type of information structure for supporting the various activities and information structures described in the present disclosure. According to an example embodiment, memory 208 is communicably connected to processor 206 via processing circuit 404 and includes computer code for executing (e.g., by processing circuit 204 and/or processor 206) one or more processes described herein.

In some embodiments, plant controller 202 is implemented within a single computer (e.g., one server, one housing, etc.). In various other embodiments plant controller 202 can be distributed across multiple servers or computers (e.g., that can exist in distributed locations). Further, while FIG. 2 shows data storage 222, and petroleum refining equipment 228 outside of plant controller 202, in some embodiments data storage 222 can be hosted within plant controller 202 (e.g., within memory 208). Memory 208 is shown to include data collector 210, episode manager 212, representative value generator 214, offline neural network model 216, and linear predictor 218.

Data collector 210 may be configured to collect or receive one or more data sets for controlling system 100. Data collector 210 may receive manipulated variables (MV's), controlled variables (CV's), and disturbance variables (DV's). MV's may be variables that can be adjusted to keep CV's at their intended set points. MV's may include control signals that are provided as inputs to equipment, setpoints that are provided as inputs to controllers, or other variables that can be directly manipulated (i.e., adjusted, set, modulated, etc.) by plant controller 202. CV's may quantify the performance or quality of one or more variables affected by the controlled system or process. Examples of CV's may include measured values (e.g., temperature, pressure, energy consumption, etc.), calculated values (e.g., efficiency, coefficient of performance (COP), etc.), or any other values that characterize the performance or state of a controllable system or process. Some CV's may be quantities that are not capable of being directly manipulated by plant controller 202 (e.g., the temperature of a fluid), but rather can be affected by manipulating corresponding MV's that affect the CV's (e.g., providing a control signal to heating/cooling equipment that operate to affect the temperature of the fluid). DV's or "load variables" may represent disturbances that can cause CV's to deviate from their respective set points. Examples of DV's include measurable or unmeasurable disturbances to the system such as outside air temperature, outside air humidity, uncontrolled sources of heat transfer, etc. DV's are typically not controllable, but may be measurable or unmeasurable depending on the type of disturbance.

Episode manager 212 may be configured to separate the collected data into one or more episodes. In some embodiments, the historical data represents a variety of different control situations over different periods of time. The full set of historical data may represent the non-linear behavior of the system over a relatively long time period (e.g., days, months, years, etc.). Each sample of the historical data may include values for all of the MV's, CV's DV's, and potentially other variables at an instantaneous time or over a time step having a predetermined duration (e.g., 1 second, 1 minute, 15 minutes, 1 hour, etc.). Each sample of the historical data may include a time stamp indicating a time at which the sample was collected and defines a corresponding "state" of system 100 at the time the sample was collected. In some embodiments, the samples of historical data are separated into "episodes" which include the historical data for a window of time. These episodes may be predetermined prior to being received at plant controller 202 (e.g., the start times, end times, and/or duration of each episode may be predefined) or can be automatically determined within plant controller 202 (e.g., via episode manager 212) based on attributes of the historical data and/or an operating condition of system 100 at a time when the historical data were collected. For example, episode manager 212 may automatically determine that an episode starts when system 100 transitions into a particular operating mode and that the episode ends when system 100 transitions out of the particular operating mode.

In some embodiments, episode manager 212 groups the time steps into "episodes" for modeling purposes. Each episode may encompass a period of time large enough to include multiple samples of the historical data (e.g., multiple time steps, etc.), but may encompass a period of time small enough such that the behavior of system 100 is substantially linear within a given episode. In other words, each episode may include a portion of the historical data that, when viewed in isolation, indicates substantially linear system behavior within the episode. In an exemplary embodiment, plant controller 202 is used to provide control instructions to system 100, which operates in a non-linear environment as indicated by the received historical data, when modeled holistically. However, the relationship between the MV's and CV's and/or the DV's and CV's can be modeled as a set of localized linear relationships when broken up into multiple episodes, which is performed by episode manager 212. Episode manager 212 may be configured to provide the linear episodes to representative value generator 214.

Representative value generator 214 may be configured to generate representative values of the MV's, CV's, and DV's for each of the episodes of the historical data. In some embodiments, the representative values may be average, median, mean, or other type of aggregated values of the MVs, DVs, and CVs over the corresponding episode. For example, the representative value of a particular MV over the episode may be the average of all of the values of that particular MV indicated by the samples of the historical data within the episode. Representative value generator 214 can be configured to generate a representative value for each of the individual MV's, each of the individual CV's, and each of the individual DV's to obtain a representative value of each variable for the episode as a whole. Each episode can be represented by a single (e.g., average) value of each variable and may correspond a particular "state" defined by the representative values of the MV's, CV's and DV's. In other words, each episode may represent a particular state which is defined as the set of representative values of the MV's, CV's and DV's for the episode. Representative value generator 214 may be configured to provide the representative values to offline neural network model 216.

Offline neural network model 216 may be configured to generate a linear predictor (e.g., linear predictor 218) as a function of the state using the representative values received by the representative value generator 214. In some embodiments, linear predictor 218 may be a gains matrix that can be used to predict the dynamic response of each CV that will result from a given change in the MV's, CV's and DV's. For example, linear predictor 218 may be a matrix that holds coefficients of a linear function that accepts inputs of "steps" of the MV's, CV's and DV's and outputs expected (resulting) steps in the predicted CV's, where a step is defined as the amount a given variable changes between consecutive time steps. Linear predictor 218 may be a matrix representing a linearized dynamic model of the plant (e.g., system 100) localized to a particular state.

In some embodiments, the historical data include not only multiple samples of the variables that affect the plant equipment (e.g., DV's, MV's, etc.) but also multiple samples of the variables that are affected by operating the plant equipment (e.g., CV's), which are the indicators of the final control product. As control systems for plants can be non-linear, the historical data is separated into episodes that allow the data to be modeled in a linear fashion. The relationships between the MV's and the CV's maintain a linear or generally linear relationship within each episode. In some embodiments, the samples within each episode are then averaged to create a single representative value of each of the variables for the episode, which are then used to train a neural network. Specifically, the sets of representative values for the various episodes may be used to train offline neural network model 216, which generates an instance of linear predictor 218 (e.g., generates the coefficients θ of the gains matrix $A(\theta)$) as a function of a given set of representative values. The instance of linear predictor 218 generated by offline neural network model 216 is then used to predict the CV values (or CV steps) as a function of the actual MV, CV, and DV values indicated by the historical data (e.g., using the equations shown above). The predicted CV values (or CV steps) calculated using linear predictor 218 can be compared against the actual CV values (or CV steps) indicated by the historical data to evaluate the prediction accuracy of linear predictor 218. If the prediction accuracy is not acceptable, the weights of offline neural network model 216 can be adjusted and this process can be repeated until the prediction accuracy of linear predictor 218 is deemed acceptable (e.g., by comparing to threshold accuracy value). This is described in greater detail below with reference to FIG. 3.

Figure 3:
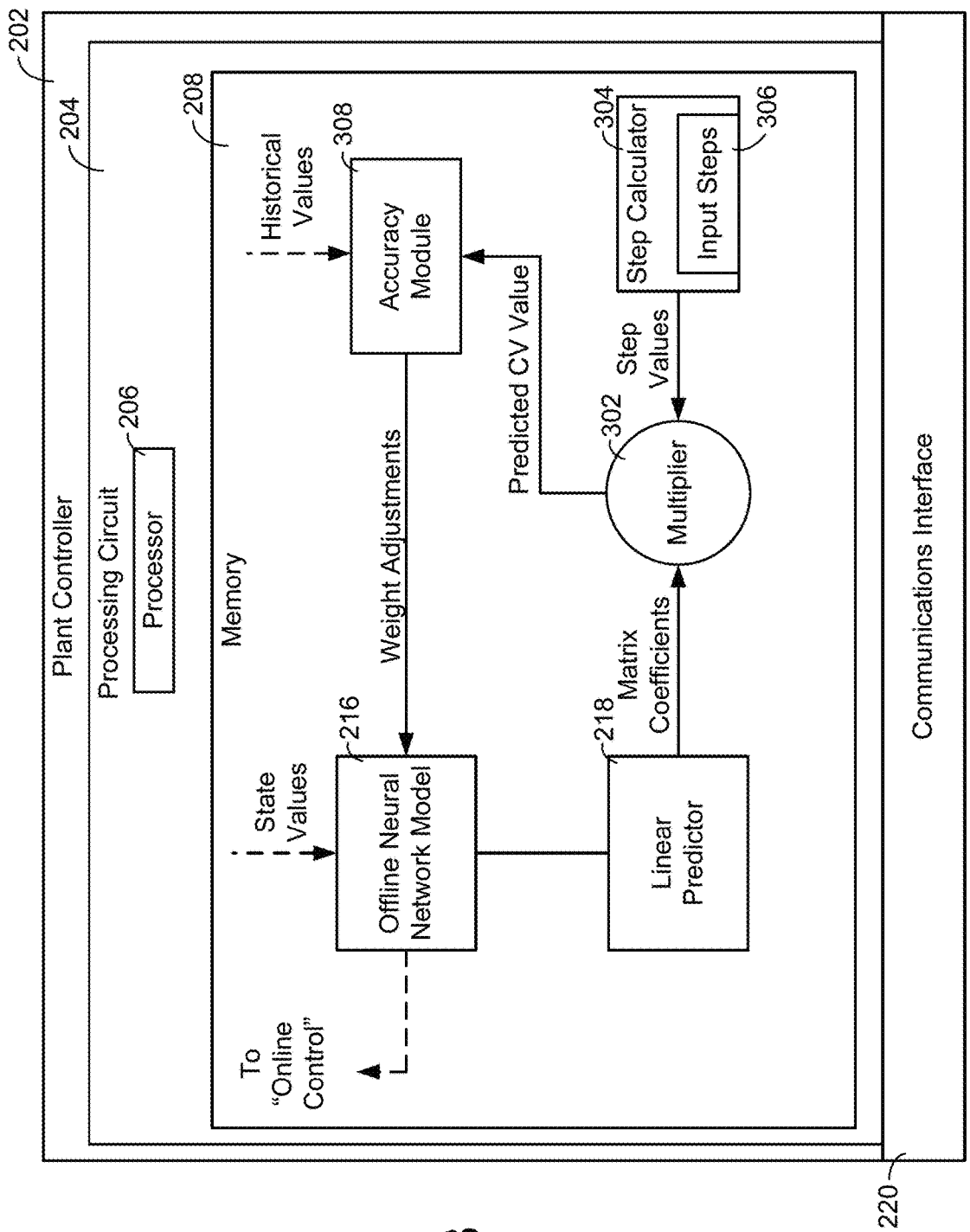
FIG. 3 is a block diagram of a controller training a neural network which can be implemented in the petroleum refinery system of FIG. 1, according to some embodiments.

While multiple components are shown individually and independent of offline neural network model 216, this is merely meant to be exemplary and is not intended to be limiting. In some embodiments, offline neural network model 216 includes some or all of the components of memory 208 as shown in FIGS. 2-3. For example, offline neural network model 216 may perform the representative value generation as performed by representative value generator 214 and supply the gains matrix to online control as performed by linear predictor 218. Linear predictor 218 may be configured to provide linearization information to the online control portion of plant controller 202, described in greater detail below with reference to FIGS. 4-5.

Sensors 226 may be configured to provide measurements of environmental data to plant controller 202 as inputs for making control decisions. In some embodiments, the information from sensors 226 acts as CV's, MV's, DV's, or any combination thereof for historical data or real-time data of system 100. Petroleum refining equipment 228 may be configured to receive control signals from plant controller 202 to adjust equipment within system 100 (e.g., valve 120, pump 122, etc.) to reach one or more setpoints (e.g., one or more CV's, etc.). Of course, it is appreciated that petroleum refining equipment 228 can be replaced with any other type of equipment when plant controller 202 is used in other types of controllable systems or plants.

Referring now to FIG. 3, a block diagram illustrating the steps performed by plant controller 202 to train offline neural network model 216 is shown, according to an exemplary embodiment. In some embodiments, FIG. 3, shows a more detailed method of training offline neural network model 216 as shown in FIG. 2. In FIG. 3, memory 208 is shown to include offline neural network model 216, linear predictor 218, multiplier 302, step calculator 304, input steps 306, and accuracy module 308.

Step calculator 304 may be configured to generate or determine the change in inputs into plant controller 202. In some embodiments, step calculator 302 takes the difference between the current inputs and the previous inputs to determine a delta, where the delta is considered a step. For example, the input step for an MV providing a voltage signal to an actuator for controlling valve 120 is the difference of the current voltage signal amplitude and the previous voltage signal amplitude over a given time step.

Multiplier 302 may act as a processing component for multiplying or combining variables to determine a predicted CV value. In some embodiments, multiplier 302 combines matrix coefficients from linear predictor 218 and input step values from step calculator 304 to determine a predicted CV value. In some embodiments, step calculator 304 is part of data collector 210 and/or episode manager 212 for determining the appropriate step data (e.g., input steps 306) to provide to multiplier 302. In an exemplary embodiment, multiplier 302 combines historical MV data with the coefficients of the linearization matrix generated by linear predictor 218 to determine an expected output, a predicted CV value. In some embodiments, multiplier 302 also receives historical CV and DV values as an input (e.g., in addition to historical MV values) and outputs the predicted CV values.

The historical data can be split into episodes and a representative value of each variable is calculated for the episode. In some embodiments, the representative values and raw data (e.g., historical data from data storage 222, etc.) may then be used to train the offline neural network. In other embodiments, the raw values of the historical data and not the representative values are used to calculate the input steps for purposes of evaluating the prediction accuracy of the linear predictor. The input steps are then multiplied by the linear predictor (or otherwise used in a function defined by the linear predictor) to predict a trajectory of CV values (or CV steps) for each episode. The predicted CV values/steps are then compared against the actual CV values/steps in the historical data to determine prediction accuracy.

Accuracy module 308 may be configured to receive the predicted CV value, compare the predicted CV value with the actual CV value from that time step as collected in the historical data, and adjust the weights of offline neural network model 216 accordingly. This process may be continued until offline neural network model 216 is appropriately trained. Once offline neural network model 216 has been trained to generate accurate instances of linear predictor 218 as a function of the current state, offline neural network model 216 may then be provided to the online control portion of plant controller 202.

In some embodiments, linear predictor 218 is ran in succession (e.g., multiple time steps into the future, etc.) and accuracy module 308 measures the error between predicted CVs and historical values along a future time horizon. Prediction at time t+1 may be based on prediction at time t. In some embodiments, prediction at time t+1 is based on prediction at time t as well as historical MV and DV values. One example of linear predictor 218 is shown as the gains matrix $A(\theta)$ in the following equation:

$$A(\theta)\Delta V_k = \Delta CV_{k+1}$$

where $A(\theta)$ is the gains matrix, $\Delta V_k$ is a vector of steps or changes in the MV's, CV's and DV's between time step k−1 and time step k, and $\Delta CV_{k+1}$ is a vector of predicted steps or changes in the CV's between time step k and time step k+1. In this example, the gains matrix $A(\theta)$ is multiplied with the vector $\Delta V_k$ of steps or changes in the MV's, CV's and DV's between time step k−1 and time step k (known from the historical data) to calculate the vector $\Delta CV_{k+1}$ of predicted steps or changes in the CV's between time step k and time step k+1.

In some embodiments, $A(\theta)$, $\Delta V_k$, and $\Delta CV_{k+1}$ have the following form:

$$A(\theta) = \begin{bmatrix} \theta_{1,1} & \cdots & \theta_{1,t} \\ \vdots & \ddots & \vdots \\ \theta_{m,1} & \cdots & \theta_{m,t} \end{bmatrix},$$

$$\Delta V_k = \begin{bmatrix} \Delta MV_{1,k} \\ \vdots \\ \Delta MV_{l,k} \\ \Delta CV_{1,k} \\ \vdots \\ \Delta CV_{m,k} \\ \Delta DV_{1,k} \\ \vdots \\ \Delta DV_{n,k} \end{bmatrix},$$

$$\Delta CV_{k+1} = \begin{bmatrix} \Delta CV_{1,k+1} \\ \vdots \\ \Delta CV_{m,k+1} \end{bmatrix}$$

where $A(\theta)$ is m×t matrix having coefficients $\theta$, m is the total number of CV's, t is the total number of MV's, CV's and DV's, $\Delta MV_{1,k} \ldots \Delta MV_{l,k}$ are the actual steps or changes in the MV's (l being the total number of MV's) that occurred between time step k−1 and time step k, $\Delta CV_{1,k} \ldots \Delta CV_{m,k}$ are the actual steps or changes in the CV's that occurred between time step k−1 and time step k, $\Delta DV_{1,k} \ldots \Delta DV_{l,k}$ are the actual steps or changes in the DV's (n being the total number of DV's) that occurred between time step k−1 and time step k, and $\Delta CV_{1,k+1} \ldots \Delta CV_{m,k+1}$ are the predicted steps or changes in the CV's between time step k and time step k+1.

System Controller—Online Plant Control

Figure 4:
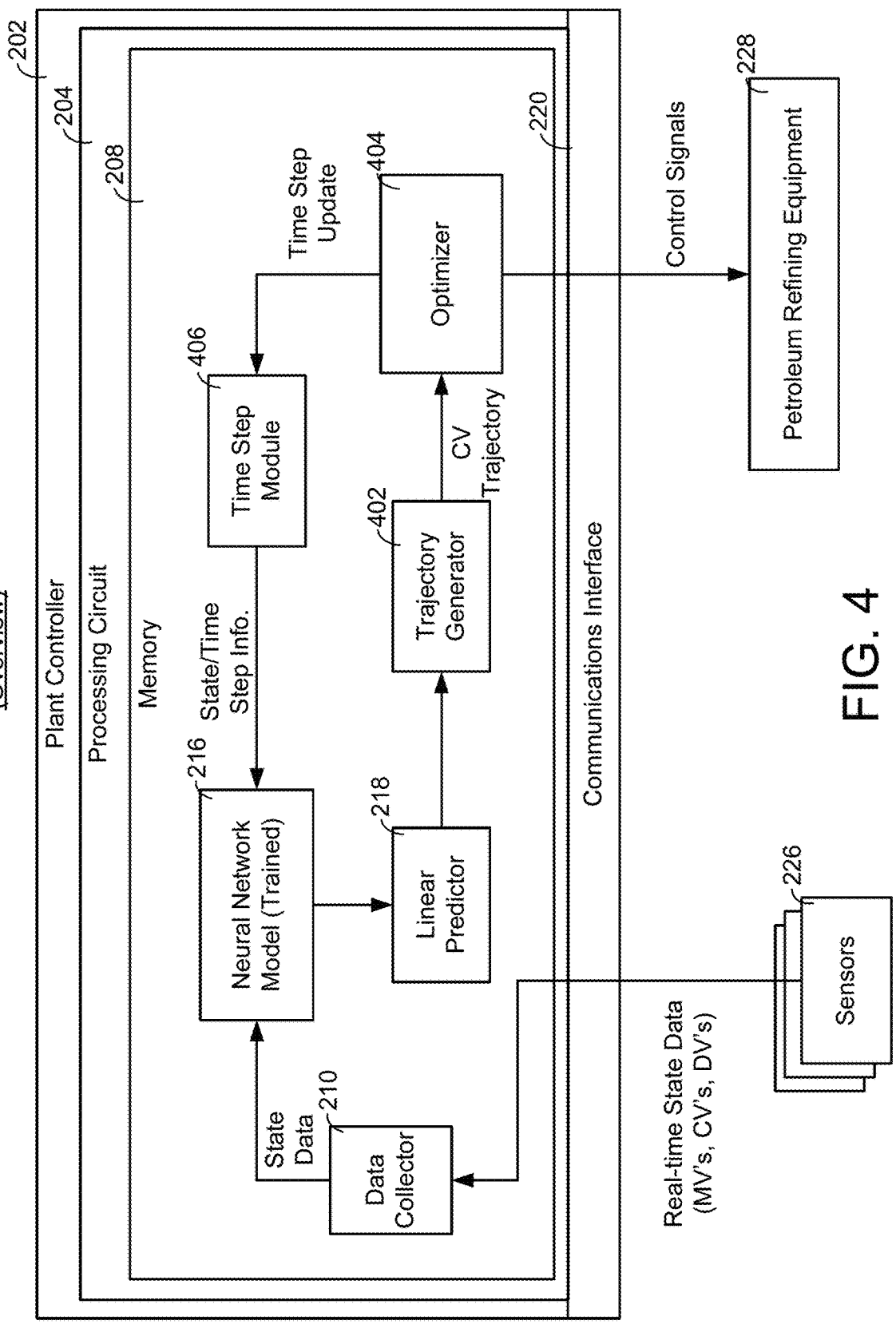
FIG. 4 is a block diagram of a controller with online control functionality based on a trained neural network, which can be implemented in the petroleum refinery system of FIG. 1, according to some embodiments.

Referring now to FIG. 4, a block diagram illustrating the functionality of plant controller 202 when performing online control of a plant (e.g., system 100) is shown, according to exemplary embodiments. In some embodiments, FIG. 4 provides an exemplary embodiment of general online control using a trained neural network model. The control scheme(s) utilized in FIG. 4 may implement MPC, NNPC, or a combination of both. For example, optimizer 404 may be a component in MPC that also receives an objective function and system constraints, as well as the gains matrix information as shown in FIG. 4.

Memory 208 is shown to include data collector 210, offline neural network model 216, linear predictor 218, trajectory generator 402, optimizer 404, and time step module 406. In some embodiments, plant controller 202 is configured to generate an instance of linear predictor 218 using trained neural network model 216, use the linear predictor to predict a trajectory of the CV's over a future time period as a function of a proposed trajectory of MV's over the future time period, and perform an optimization process to adjust the proposed trajectory of MV's over the future time period to drive the predicted trajectory of CV's toward target values of the CV's. In some embodiments (e.g., process 1000, etc.), plant controller 202 trajectory generator 502 is not used and a neural network (e.g., neural network 522 described below) receives plant state (e.g., historical window of MVs/CVs/DVs) and outputs MV moves.

Data collector 210 receives real-time data (MV's, CV's, and/or DV's) from one or more data sources including, for example, sensors 226 measuring parameters within system 100, in some embodiments. Data collector 210 can be configured to identify or determine a current state of system 100 based on the collected data. In some embodiments, the current state is defined by a value for each of the MV's, CV's, and/or DV's. Accordingly, the state data generated by data collector 210 may include a current value for each of the MV's, CV's, and/or DV's (i.e., the "current state") and may also include a historical window of the state data. For example, the historical window can include one or more values of the MVs, CVs and DVs for a state, or may include one or more representative values of one or more episodes.

After neural network model 216 has been trained (e.g., via the training method described above with reference to FIG. 3), the state data from data collector 210 can be provided as an input to neural network model 216. Neural network model 216 receives the state data as an input and generates an instance of linear predictor 218 as an output. In some embodiments, neural network model 216 generates a set of coefficients θ as an output, which can be used to generate an instance of the gains matrix A(θ), for embodiments in which linear predictor 218 is the gains matrix A(θ).

Trajectory generator 402 then uses linear predictor 218 to determine a trajectory of the state variables. For example, trajectory generator 402 determines a trajectory of the CV variables (e.g., as MVs are predetermined and DVs may be unknown) over a period of time based on the relationships (e.g., linear approximations of non-linear relationships) between the CV's, MV's and DV's defined by linear predictor 218. In some embodiments, the trajectories are vectors that include a value of the corresponding variable for each time step of the future time period. Using the instance of linear predictor 218 for the current state to predict a trajectory of the CV's over a future time period and adjusting accordingly can be performed using Model Predictive Control (MPC), described in greater detail below. In some embodiments, Neural network process control (NNPC) is trained (e.g., via linear predictor 218, etc.) to receive historical data and provide MV moves for satisfying an objective function. This is described in greater detail below.

Optimizer 404 may be configured to receive the CV trajectory from trajectory generator 402 and adjust the MV values in order to drive the predicted CV values toward desired values. In some embodiments, this is performed by attempting to optimize an objective function (i.e., a function that calculates the error between actual and desired CV values). The objective function(s) may also consider the monetary cost of operating the system in terms of energy consumption, material consumption, or other costs associated with operating the equipment. Objective functions can be augmented with various terms to consider other optimization objectives as well such as penalties for certain types of actions (e.g., switching equipment on/off too rapidly, changing the control signal too rapidly, etc.), penalties for variables exceeding certain limits. These types of penalties can be incorporated into the objective function if they are permitted, or implemented as hard constraints on the optimization if they are unacceptable and absolutely need to be avoided. In some embodiments, trajectory generator 402 generates trajectories for CVs and/or MVs based on the linear predictor of the current state. Optimizer 404 then adjusts the MV's in the trajectory time period to drive the predicted trajectory of CVs toward target values of the CVs. This may reduce error between predicted CV's and target values.

Time step module 406 may be configured to progress plant controller 202 to the next time step for further control. In some embodiments, plant controller 202 may want to adjust the trajectory generated by trajectory generator 402 when a certain amount of time has passed (e.g., 1 minute, 1 hour, 1 day, 1 week, etc.), as an adjusted trajectory generated based on a linear predictor of the current state will be more accurate the more recently it has been generated. In some embodiments, this update occurs with each time step. Time step module 406 may receive a time step update from optimizer 404 indicating that the optimization process has been completed, that there has been a predetermined amount of optimization based on the received trajectories, that there is no more optimization that can occur, or any combination thereof. Time step module 406 may then provide instructions to trained neural network model 216 to update the linear predictor and current state calculations for more recent trajectories.

Online Control with Trained Neural Network—Model Predictive Control

Figure 5A:
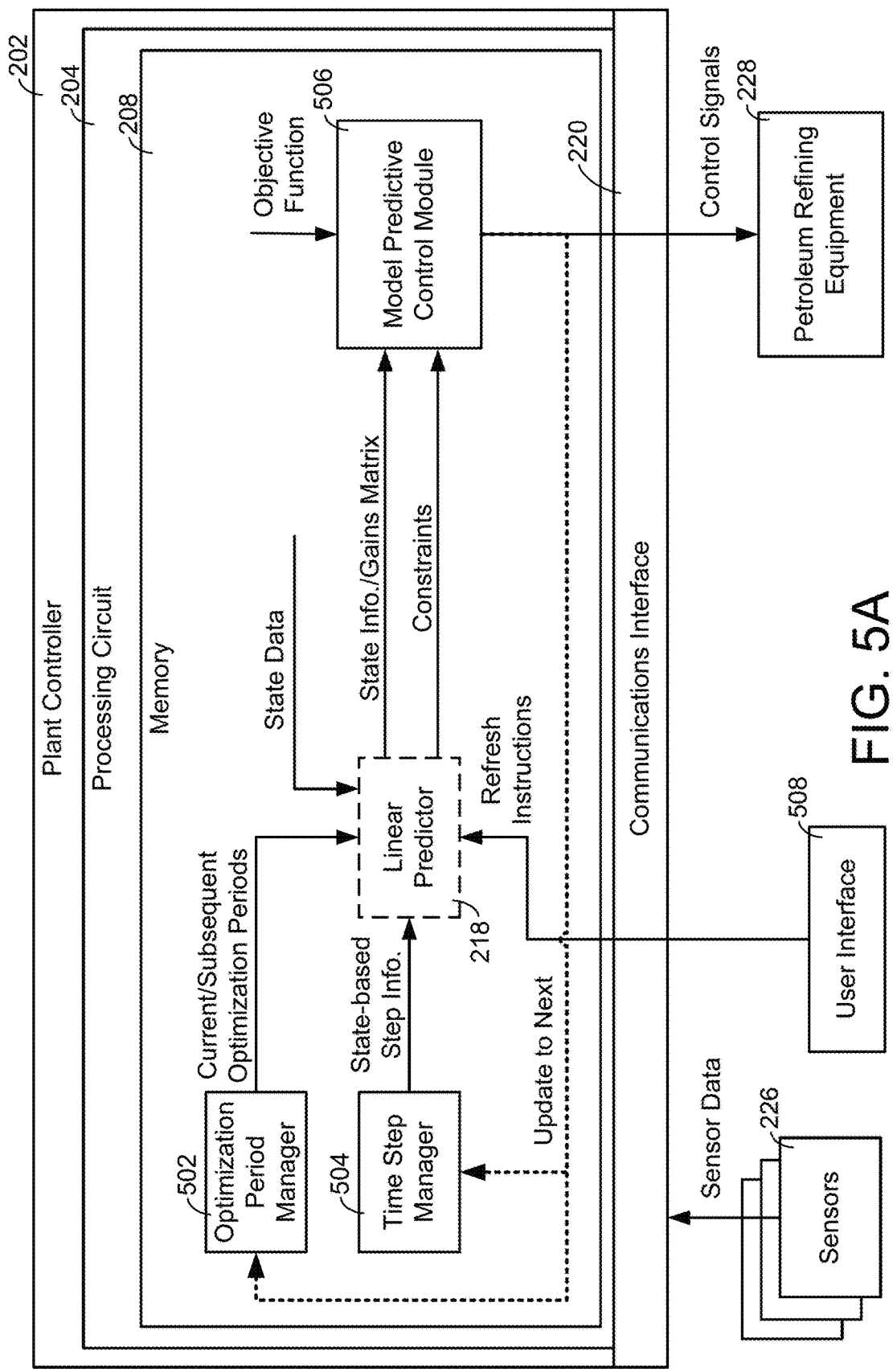
FIG. 5A is a block diagram of a plant controller using model predictive control (MPC), which can be implemented in the petroleum refinery system of FIG. 1, according to some embodiments.

Referring now to FIG. 5A, a block diagram illustrating an implementation in which plant controller 202 uses model predictive control (MPC) to perform online control is shown, according to exemplary embodiments. Memory 208 is shown to include optimization period manager 502, time step manager 504, linear predictor 218, and model predictive control module 506. MPC is an advanced method of process control that uses a predictive model of the system to predict how controlled variables will change as a function of control decisions (i.e., manipulated variables). MPC can be used in combination with optimization to both predict how controlled variables will change as a function of the control decisions and generate a set of optimal control decisions that are predicted to optimize an objective function (e.g., minimize cost, reduce error between predicted values of the controlled variables and desired values, etc.) over a given time period. The optimization can be performed subject to a set of constraints including a constraint based on the model of the system. A high-level example of MPC is described below.

In some embodiments, plant controller 202 uses linear predictor 218 as the predictive model in MPC. One example of linear predictor 218 which can be used to perform MPC is shown in the following equation:

$$A(\theta)\Delta V_k = \Delta CV_{k+1}$$

where A(θ) is a gains matrix containing a set of coefficients θ (generated by neural network model 216 based on the current state), $\Delta V_k$ is a vector of steps or changes in the MV's, CV's and DV's between time step k−1 and time step k, and $\Delta CV_{k+1}$ is a vector of predicted steps or changes in the CV's between time step k and time step k+1. In this example, the gains matrix A(θ) is multiplied with the vector $\Delta V_k$ of steps or changes in the MV's, CV's and DV's between time step k−1 and time step k (known from historical data or pre-calculated and provided as inputs to MPC) to calculate the vector $\Delta CV_{k+1}$ of predicted steps or changes in the CV's between time step k and time step k+1. In some embodiments, A(θ), $\Delta V_k$, and $\Delta CV_{k+1}$ are formulated as previously described.

Linear predictor 218 models the relationship between $\Delta V_k$ and $\Delta CV_{k+1}$ as a linear function. Although the true relationship between $\Delta V_k$ and $\Delta CV_{k+1}$ may be non-linear and may vary depending on the current state of system 100, the linear relationship modeled by linear predictor 218 may be reasonably accurate when localized to the current state of plant 100. In other words, even if the overall function relating $\Delta V_k$ and $\Delta CV_{k+1}$ is non-linear, portions of the non-linear function (i.e., the performance map) may appear linear when viewed in isolation, and therefore linear predictor 218 may accurately represent the relationship between $\Delta V_k$ and $\Delta CV_{k+1}$ within select portions.

In some embodiments, plant controller 202 optimizes an objective function subject to a constraint based on linear predictor 218. The objective function may have any of a variety of forms in various embodiments, one of which is shown in the following equation:

$$J = \sum_{k=1}^{h} |CV_k - CV_{sp,k}|$$

where J is the value of the objective function, $CV_k$ is the predicted value of a particular CV at time step k, and $CV_{sp,k}$ is the setpoint or desired value of the particular CV at time step k, and h is the total number of time steps in the optimization period (i.e., the duration of the time horizon over which the optimization is performed). In this example, the difference between the predicted value of the CV and the setpoint value of the CV (i.e., the error relative to setpoint) at each time step is summed over the duration of the optimization period to calculate the value of the objective function J. Although only one CV is shown in this example, any number of CVs can be added to the objective function by adding another absolute value term for each additional CV. The values of $CV_{sp,k}$ in the objective function may be known inputs (e.g., defined by setpoint values for the CV's), whereas the values of $CV_k$ are decision variables in the objective function. The constraint based on linear predictor 218 may define the values of $CV_k$ at each time step k as a function of the values of the MV's, CV's, and DV's at one or more previous time steps. Accordingly, optimizing the objective function subject to the constraint d on linear predictor 218 may generate optimal values of not only the CV's, but also the MV's at each time step of the optimization period (i.e., trajectories of optimal values for each CV and MV).

The MPC may include simulating multiple potential trajectories of the MV's and corresponding CV's (e.g., DVs in the future are unknown and assumed to maintain current value, the DV's may be known inputs having established values, etc.) and adjusting the trajectories of CV's and MV's to optimize the objective function over the duration of the time horizon. This produces an optimal trajectory (i.e., a time series of optimal values) for each of the MV's and CV's over the time horizon. The MPC may then implement the optimal values of the MV's for the first time step (e.g., by providing them as inputs to the controlled equipment). In other words, a simulation to optimize control is run over many time steps, but only the first time step is implemented. The time horizon may then be shifted forward in time by the duration of one time step and the entire MPC process may be repeated for the new time horizon. This can allow the system to continuously re-optimize the control based on the newly implemented state. This process may be repeated to reach a desired output.

MPC may impose constraints on various inputs into the system. Advantageously, this can allow the inputs to be modeled such that step-by-step optimization can occur in accordance with the simulated optimization of inputs. The functionality of base control as disclosed herein may include several types and/or modifications of standard MPC, such as nonlinear MPC, linear MPC, explicit MPC, and robust MPC.

In some embodiments, FIG. 5A represents systems and methods for providing control signals to petroleum refining equipment 228 based on a combination of a current gains matrix, one or more constraints in the system, and one or more objective functions that model predictive control module 506 is attempting to reach. Constraints, as referred to herein, can refer to any mechanical affect that limits the signal in some manner. For example, the maximum rotational speed of a valve, the pump speed of a pump, etc. Constraints may also refer to limited bandwidth of radio frequency (RF) communications, limited network traffic, and overall processing speeds of components. In some embodiments, constraints may specify that MVs or CVs cannot exceed certain values or drop below certain values.

Optimization period manager 502 may be configured to determine a specific optimization period for model predictive control module 506, which can be similar, identical, or distinctly different than the time periods determined by time step manager 504. In some embodiments, optimization period manager 502 provides current and subsequent optimization periods to linear predictor 218, such that model predictive control module 506 can generate trajectory of MV steps.

Linear predictor 218 is shown to receive state-based step information (e.g., steps or changes in value of the CV's, MV's, and DV's relative to the previous time step), current/subsequent optimization periods, state data (e.g., current or past values of the CV's, MV's, and DV's), and potential refresh instructions. Linear predictor 218 may use these inputs to predict the values of the CV's (or CV steps) as a function of the state data and/or provide a constraint defining the relationship between the MVs and the resulting values of the CVs to model predictive control module 506. While the constraints are shown to be provided by linear predictor 218, they may also be supplied externally (e.g., via user input) or otherwise known to model predictive control module 506. Once the gains matrix defining the relationships between the MVs and the CVs is generated for the current state (based on the state-based step information), model predictive control module 506 can make use of these relationships when performing the model predictive control process, as described above.

In some embodiments, model predictive control module 506 attempts to optimize the received objective function (e.g., via user input, previously-stored within memory 208, received via another component within memory 208, etc.) by using the gains matrix to determine how the implementation of MV changes will affect the CV's and thus, predict how the objective function will be optimized (or not optimized). As the gains matrix (e.g., matrix information from linear predictor 218) is based on linear representations of episodes of historical state data, this allows model predictive control module 506 to more accurately predict how the CV's will respond to changes in MV's according to a linear approximation of a non-linear system. Once an optimization has been implemented and MV's have been adjusted (e.g., control signals have been sent to petroleum refining equipment 228) plant controller 202 may update the time step and/or optimization period for future calculations. This is described in greater detail below with reference to FIG. 8.

In some embodiments, linear predictor 218 may receive instructions to update (e.g., via user interface 508, etc.). This may be done to provide a more recent and accurate account of a current gains matrix, as the gains matrix may only resemble predictions for a single state. In some embodiments, linear predictor 218 is updated every time step. In other embodiments, linear predictor 218 is updated periodically (e.g., every minute, every hour, every day, every week, etc.) or in response to a determination that linear predictor 218 is no longer accurate (e.g., by comparing predicted CV values to actual CV values).

Online Control with Trained Neural Network—Neural Network Process Control

Figure 5B:
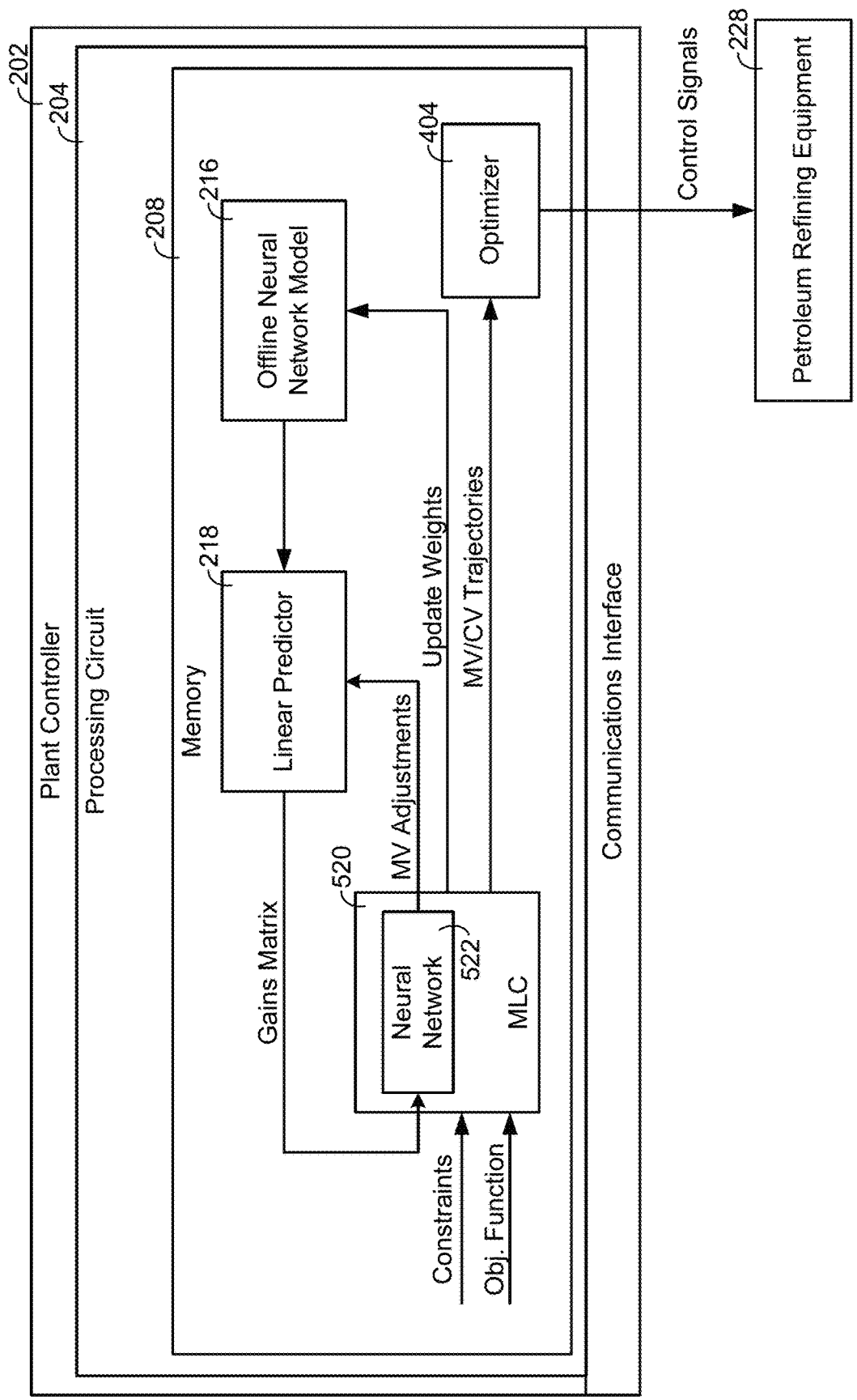
FIG. 5B is a block diagram of a plant controller using neural network process control (NNPC), which can be implemented in the petroleum refinery system of FIG. 1, according to some embodiments.

Referring now to FIG. 5B, a block diagram illustrating an implementation in which plant controller 202 uses neural network process control (NNPC) to perform online control is shown, according to some embodiments. Memory 208 is shown to include linear predictor 218, offline neural network model 216, optimizer 404, machine learning controller (MLC) 520, and neural network 522.

The embodiment shown in FIG. 5B may be substantially the same as the embodiment shown in FIG. 5A, with the exception that the MPC process of FIG. 5A is replaced with NNPC for online control in FIG. 5B. Linear predictor 218 (e.g., a gains matrix) may be generated by offline neural network model 216 as a function of the current state as previously described. However, instead of being used to constrain a MPC process, linear predictor 218 may be supplied as an input to neural network 522. In some embodiments, this is done to train neural network 522.

Offline neural network model 216 may be trained in a similar manner as described above (e.g., using historical data, etc.). Offline neural network model 216 may then generate linear predictor 218. Linear predictor 218 may then provide a gains matrix to MLC 520 for training neural network 522. MLC 520 includes neural network 522, which uses the received gains matrix as training data. MLC 520 may then determine MV's by using the state data and without using the gains matrix. Neural network 522 then provides the MV adjustments for the next time step to linear predictor 218. In the next iteration, linear predictor 218 makes CV predictions based on the MV adjustments and provides them again to neural network 522.

Generally, neural network 522 may act as a MLC training mechanism for receiving the state information from linear predictor 218 and outputting MV moves designated to meet the pre-specified constrains and objectives. In some embodiments, neural network 522 iteratively generates trajectories into the future (e.g., MLC outputs MV moves and liner predictor 218 outputs estimated CV responses, etc.) and updates the weights of neural network 522, offline neural network model 216, or both in response. In some embodiments, MLC 520 is continuously applied to petroleum refining equipment 228 after both offline neural network model 216 and neural network 522 are trained.

While not directly shown in FIG. 5B, plant controller 202 may also be configured to provide online control using global NNPC control. This may be similar to local NNPC control as described above, except that neural network 522 is trained not via the gains matrix generated by offline neural network model 216, but directly on offline neural network model 216. In such embodiments, offline neural network model 216 acts as a predictor for MLC training in neural network 522, wherein (e.g., at each episode, at each step in an episode, etc.) during the training process, a new gains matrix is generated and used to estimate CV moves. This provides a single MLC that can be applied for closed loop control, wherein linear predictor 218 would not be needed during online control.

System Control Processes

Figure 6:
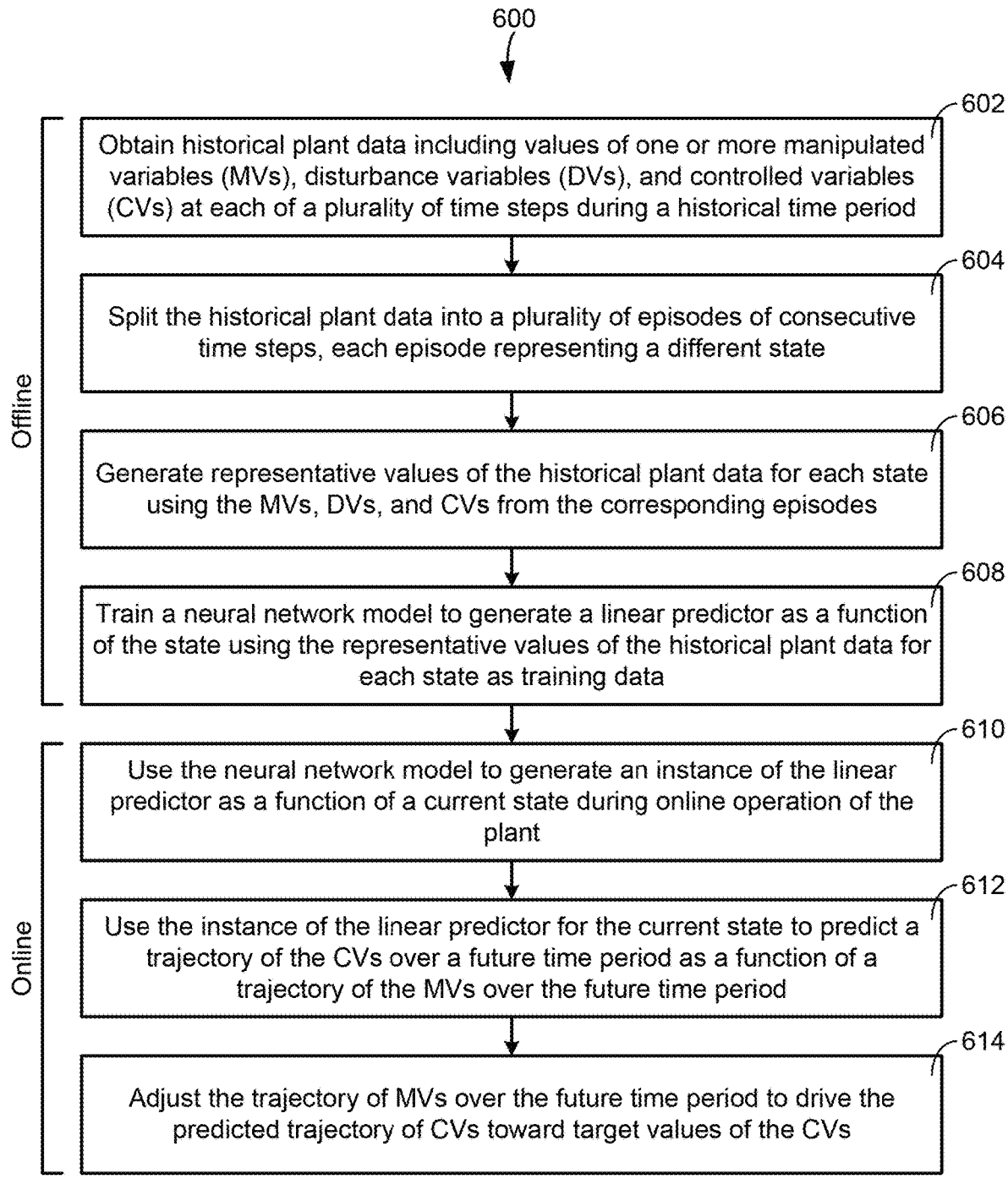
FIG. 6 is a flow diagram of a process for offline learning and online control of a plant controller, which can be implemented by the controller of FIG. 2, according to some embodiments.

Referring now to FIG. 6, a process 600 for implementing offline training for online control of system 100 is shown, according to an exemplary embodiment. Process 600 may be implemented by any one or more of the control devices described herein, such as plant controller 202.

Process 600 is shown to include obtaining historical plant data including values of one or more manipulated variables (MVs), disturbance variables (DVs), and controlled variables (CVs) at each of a plurality of time steps during a historical time period (step 602). Prior to implementing any control decisions or even communicably connecting with system 100 to implement control, plant controller 202 may train an offline neural network model with historical plant data throughout multiple time steps during a historical time period. For example, data storage 222 provides historical data (MV's, VC's, and DV's) to data collector 210 to begin a process of training offline neural network model 216 to dynamically control a plant (e.g., system 100). This historical data may include days, months, and/or years of data, but when split into various "episodes" (as described above), can allow the data to be analyzed in periods of minutes or hours. In some embodiments, the historical data is separated into smaller time intervals to organize the historical data into multiple instances of linear behavior when modeled one time interval at a time.

Process 600 is shown to include splitting the historical plant data into a plurality of episodes of consecutive time steps, each episodes representing a different state (step 604). As described herein, a state may act as the current values for the MV, CV and DV variables at that instance in time and/or at a given time step. The episodes may include a representation (e.g., an average, etc.) of multiple different states for each of the control variables. For example, 12 years of historical data is received by plant controller 202. The data is separated into episodes of 3-4 hours by episode manager 212. The particular time ranges of the episodes may be based on times in which the data acts linear in an otherwise non-linear system.

Process 600 is shown to include generating representative values of the historical plant data for each state using the MVs, DVs, and CVs from the corresponding episodes (step 606). Once the episodes have been determined, representative value generator 214 may average the values of the episodes to obtain an estimated state representation of the multiple episodes, where each episode/state can be represented by one average value of each variable (e.g., CV's, MV's, and DV's). In some embodiments, each episode is processed and is represented by representative values, such that each episode is represented by independent and singular sets (e.g., of MVs, CVs, and/or DVs, etc.) of representative values.

Process 600 is shown to include training a neural network model to generate a linear predictor as a function of the state using the representative values of the historical plant data for each state as training data (step 608). Continuing with the above example, after the episodes have been determined by averaging the states from the historical data, a neural network generates a linear predictor as a function of the state. The linear predictor may be configured to predict future CV's (e.g., predict the CV's for the next time step, etc.) based on current state information. The neural network continues to be trained until the predicted CV values from the linear predictor are substantially close to the actual CV values from the historical data. This step is outlined in greater detail below with reference to FIG. 7 and process 700. In some embodiments, the above steps 602-608 may all be performed prior to the control system (e.g., plant controller 202) going online and communicably connecting with system 100 (e.g., prior to implementing online control, etc.).

Process 600 is shown to include using the neural network model to generate an instance of the linear predictor as a function of a current state during online operation of the plant (step 610). The neural network model may generate a linear predictor of the current state, such that the linear predictor can use current state information to predict the CV values of a future time period (e.g., the next time step, etc.).

Process 600 is shown to include using the instance of the linear predictor for the current state to predict a trajectory of the CVs over a future time period as a function of a trajectory of the MVs over the future time period (step 612). In some embodiments, the linear predictor is a function of the current state and provides future CV output variables. This can allow plant controller 202 to predict what the CV variables will be for future time periods based on certain MV's.

Process 600 is shown to include adjusting the trajectory of MVs over the future time period to drive the predicted trajectory of CVs toward target values of the CVs (step 614). Once a model of the CV's has been generated, correction action can now be implemented to optimize the control of the MV's to better reach the intended CV's. For example, control instructions may be provided to petroleum refining equipment 228 to adjust the MV's of system 100 upon an indication from trajectory generator 402 that the projected CV values will differ greatly from the intended CV values if no changes are made to the present MV's. As such, plant controller 202 adjusts the MV's accordingly.

Neural Network Training Process

Figure 7:
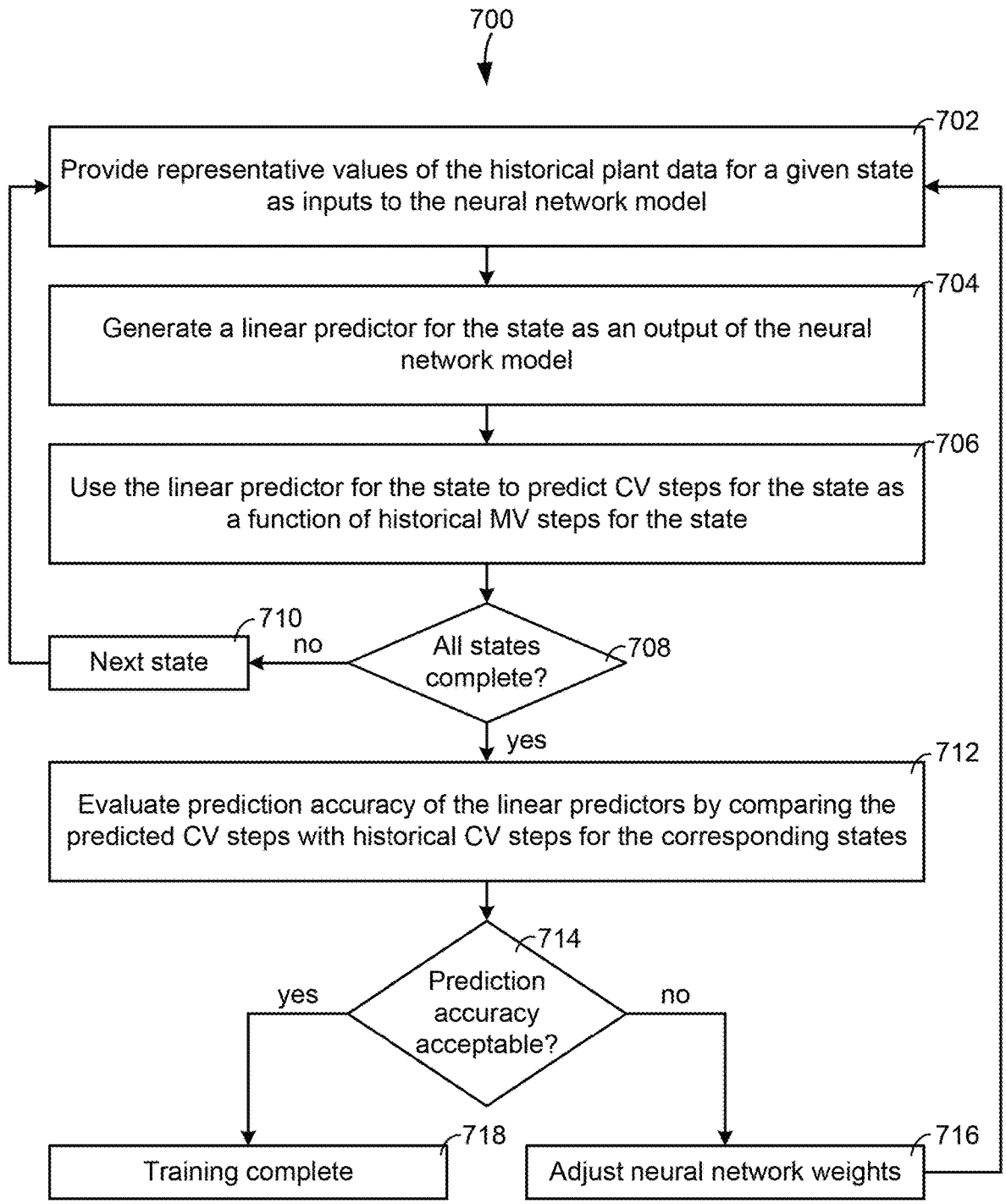
FIG. 7 is a flow diagram of a process for training an offline neural network, which can be performed by the controller of FIG. 3, according to some embodiments.

Referring now to FIG. 7 a process 700 for training an offline neural network is shown, according to exemplary embodiments. Process 700 may be implemented by any one or more of the control devices described herein, such as plant controller 202.

Process 700 is shown to include providing representative values of the historical plant data for a given state as inputs to the neural network model (step 702) and generating a linear predictor for the state as an output of the neural network model (step 704). In some embodiments, representative values are averages of the variables (e.g., CV's, MV's, DV's, etc.) for a particular episode. In some embodiments, offline neural network model 216 receives state values (e.g., the representative values, etc.) and generates a linear predictor 218 based on the state values. In some embodiments, these first steps (steps 702-704) are repeated using the same offline neural network model 216 until each state/episode in the historical data has been processed (i.e., a linear predictor has been generated for each state and used to predict the CV steps for the state).

Process 700 is shown to include using the linear predictor for the state to predict CV steps for the state as a function of historical MV steps for the state (step 706). In some embodiments, linear predictor 218 provides predicted CV steps for the state as a function of historical MV steps for the state. In one embodiment, each time step (i.e., each CV value) in the historical data is evaluated independently and the predictor uses the actual value of the CV in the historical data in combination with the historical MV step to predict the next CV step. This may be repeated for each time step, and may use the actual CV value as the baseline for making the prediction.

In another embodiment, only the first actual CV value is used in the prediction. The predicted CV step from the first time step is used in combination with the historical MV step to predict the next CV step. The predicted CV step may then be applied to the previous CV value to predict the next CV value (which may differ from the actual CV value for the next time step). The predicted CV value for the next time step may then be used in combination with the historical CV value for the next time step to generate the next CV step (and so on), to generate an entire trajectory from only the first actual CV value.

Process 700 is shown to include a decision block for determining if all states are complete (step 708). Once plant controller 202 determines the representative values for an episode, the process repeats itself until all of the states/episodes in the historical data set have been processed. In the event that all states have not been completed, process 700 moves to next state 710 and repeats the process beginning again at step 702. In the event that all states have been processed, process 700 progresses to step 712.

Process 700 is shown to include evaluating prediction accuracy of the linear predictors by comparing the predicted CV steps with historical CV steps for the corresponding states (step 712) and determining if the prediction accuracy is acceptable (step 714). In some embodiments, this step is performed by accuracy module 308. Accuracy module 308 may be configured to input predicted CV values and comparing them to the historical CV step values. In some embodiments, the prediction is considered accurate if the prediction is within a certain percentage of the historical CV step values. For example, if the predicted control variable for one step is 23° C., the historical CV step value is 25° C., and the accuracy threshold is 5% of the historical CV step value, then accuracy module 308 would indicate that offline neural network model 216 is not accurate enough. Accuracy module 308 may then adjust the weights of the offline neural network model 216, as shown by step 716. If accuracy module 308 determines that the prediction is accurate, the training may be complete and the neural network is ready for online operation (step 718). In some embodiments, after completion of step 718, process 700 progresses to step 610 as described above.

In some embodiments, the adjustment of the weights of offline neural network model 216 based on prediction accuracy is performed via an optimization process (e.g., stochastic gradient descent). In some embodiments, when implementing stochastic gradient descent (SGD), an accuracy error term (e.g., loss) is defined, and SGD iteratively tunes weights to minimize it. In some embodiments, training may occur across consecutive time steps where the CVs input to the prediction at time t+1 are those predicted at time t (e.g., as opposed to historical values). In some embodiments, this does not apply to MVs and DVs values, which are taken from historical data (e.g., data storage 222).

Online Control Process—Model Predictive Control

Figure 8:
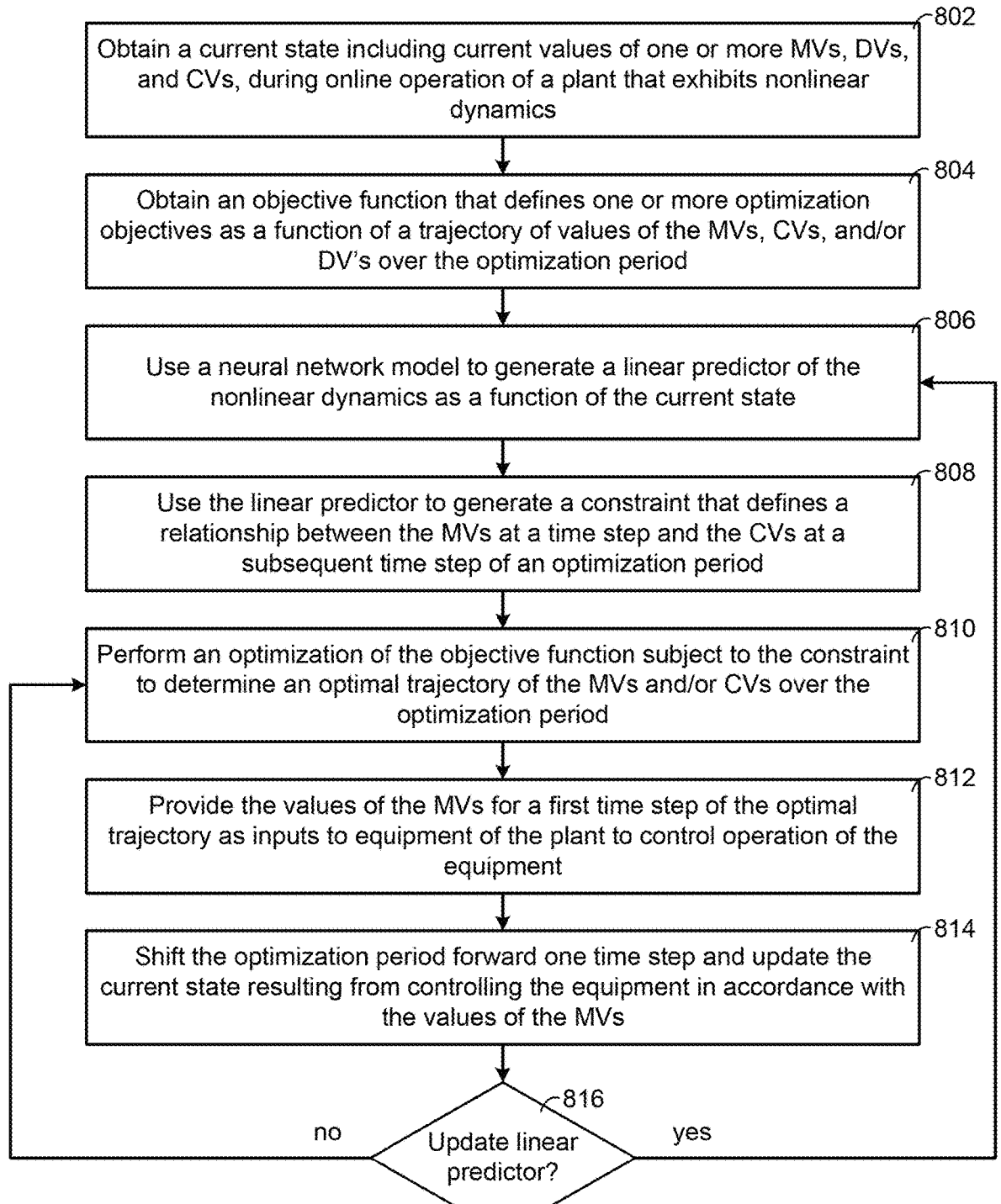
FIG. 8 is a flow diagram of a process for implementing online control using MPC, which can be performed by the controller of FIG. 5A, according to some embodiments.

Referring now to FIG. 8, a process 800 for implementing online control using model predictive control (MPC), according to exemplary embodiments. Process 700 may be implemented by any one or more of the control devices described herein, such as plant controller 202.

Process 800 is shown to include obtaining a current state including current values of one or more MVs, DVs, and CVs, during online operation of a plant that exhibits non-linear dynamics (step 802). This step may be similar to any of the other data collecting steps described above. For example, data collector 210 receives MV, CV, and DV information from data storage 222. In some embodiments, this data is received for current state, which may refer to a single instance of an MV, CV, and DV data or an averaged episode/state data set performed to linearize the data via episode manager 212.

Process 800 is shown to include obtaining an objective function that defines one or more optimization objectives as a function of a trajectory of values of the MVs, CVs, and/or DV's over the optimization period (step 804). Generally in control theory, an objective function is optimized in a dynamic system—typically over a period of time. Objective functions may be implemented in optimal control theory (e.g., model predictive control, etc.). In some embodiments, objective functions include cost functions, such as mean squared error functions, and loss functions, such as square loss functions, hinge loss functions, and 0/1 loss functions. In a general embodiment, a loss function is a part of a cost function which can be a type of an objective function. As referred to herein, an objective function may be optimized for CVs being close to given targets, CVs not violating given bounds, MVs not violating given bounds, CVs being as large or as small as possible, CVs being as close as possible to given target values, different formulas involving CVs, MVs external variables (e.g. market prices, etc.) being as large or small as possible.

Process 800 is shown to include using a neural network model to generate a linear predictor of the nonlinear dynamics as a function of the current state (step 806). In some embodiments offline neural network model is trained via methods described above to generate a predictor of CV variables for a given state, linear predictor 218. Linear predictor 218 may include a linearization of the plant operation for a given state.

Process 800 is shown to include using the linear predictor to generate a constraint that defines a relationship between the MVs at a time step and the CVs at a subsequent time step of an optimization period (step 808). In some embodiments, linear predictor 218 generates a linear dependence between signals (e.g., signal moves) at current time steps and CV (e.g., CV moves) at the next time step. The constraints within system 100 may include limitations between the MV's at a given time step and CV's at a subsequent time step. This may include setpoints, mechanical limitations, safety requirements, and other instances that hinder the ability for the MV's to appropriately adjust the CV to a desired set point.

Process 800 is shown to include performing an optimization of the objective function subject to the constraint to determine an optimal trajectory of the MVs and/or CVs over the optimization period (step 810). In some embodiments, model predictive control module 506 attempts to optimize the objective function in light of the determined constraints. As the constraints are based on a linearized model of the operation of system 100, this allows model predictive control module to make more accurate and effective optimization decisions.

Process 800 is shown to include providing the values of the MVs for a first time step of the optimal trajectory as inputs to equipment of the plant to control operation of the equipment (step 812) and shifting the optimization period forward one time step and updating the current state resulting from controlling the equipment in accordance with the values of the MVs (step 814). Once complete, control signals may then be sent to petroleum refining equipment 228 to optimize (e.g., minimize or maximize, etc.) the objective function. This may also induce a time jump to the next time step, so a new linear predictor can be made to predict CV information. In some embodiments, this is performed by providing a signal to time step manager 504 to update the time step.

Online Control Process—Neural Network Process Control

Figure 9:
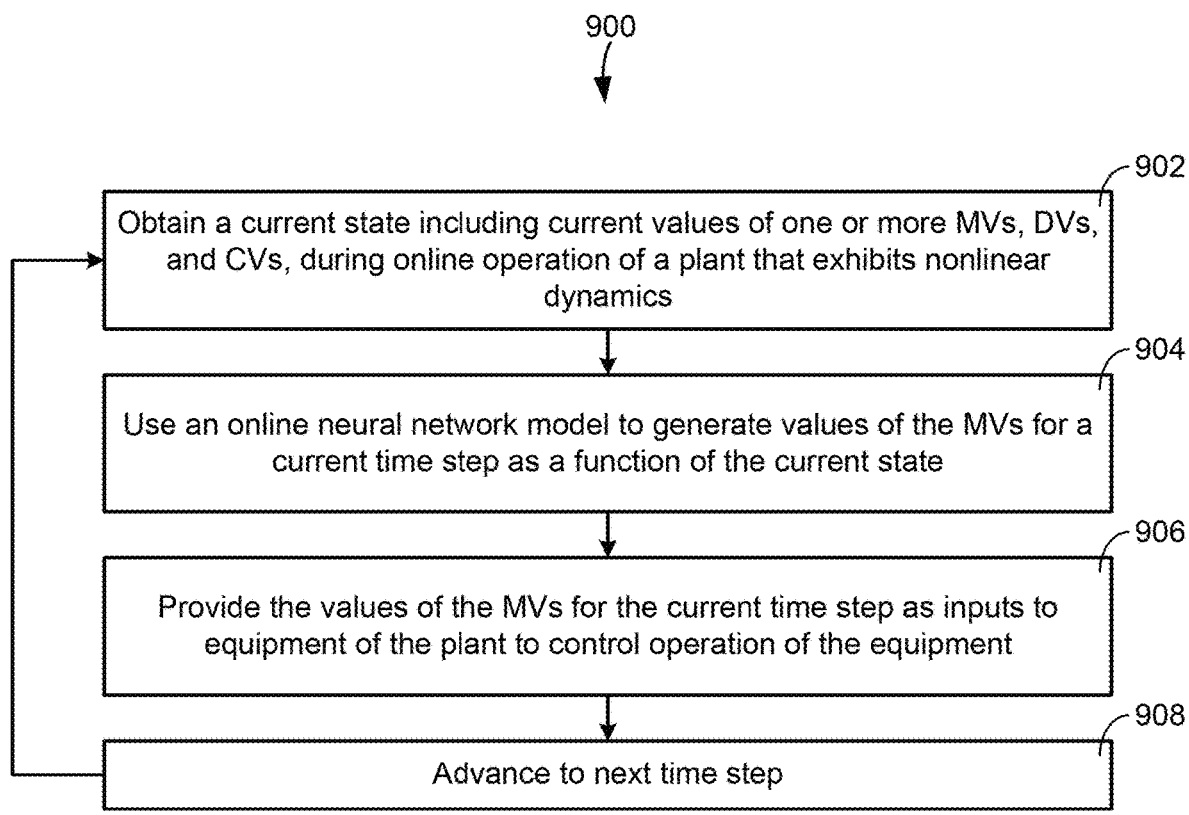
FIG. 9 is a flow diagram of a process for implementing online control using NNPC, which can be performed by the controller of FIG. 5B, according to some embodiments.

Referring now to FIG. 9, a process 900 for implementing online control using NNPC is shown, according to some embodiments. Process 900 may be implemented by any one or more of the control devices described herein, such as plant controller 202.

Process 900 is shown to include obtaining a current state including current values of one or more MVs, DVs, and CVs, during online operation of a plant that exhibits non-linear dynamics (step 902). This step may be similar to any of the other data collecting steps described above. For example, data collector 210 receives MV, CV, and DV information from data storage 222. In some embodiments, this data is received for current state, which may refer to a single instance of an MV, CV, and DV data or an averaged episode/state data set performed to linearize the data via episode manager 212.

Process 900 is shown to include using an online neural network model to generate values of the MVs for a current time step as a function of the current state (step 904). Neural network 522 may act as the online neural network and determines MV moves based on the historical CV/MV/DV state data. In some embodiments, neural network 522 is trained based on a model of the plant (e.g., linear predictor 218, offline neural network model 216, etc.) in order to improve an objective (e.g., to optimize an objective function, to meet one or more constraints, etc.). In other embodiments, neural network 522 is trained by comparing the MV moves to the actual MV moves of the historical data to determine an accuracy of neural network 522. This process is described in greater detail below with reference to FIG. 10.

Process 900 is shown to include providing the values of the MVs for the current time step as inputs to equipment of the plant to control operation of the equipment (step 906). Once the online neural network (e.g., neural network 522) has been appropriately trained, the MV values can be used as inputs to petroleum refinery equipment 228 to implement control over system 100.

Process 900 is shown to include advancing to the next time step (step 908). Once the MV values have been provided as inputs to petroleum refinery equipment 228, plant controller 202 may advance to the next time step, and neural network 522 may begin training with state data from offline neural network model 216. This state data may include one or more linear predictors generated via offline neural network model 216.

Online Neural Network Training—Neural Network Process Control

Figure 10:
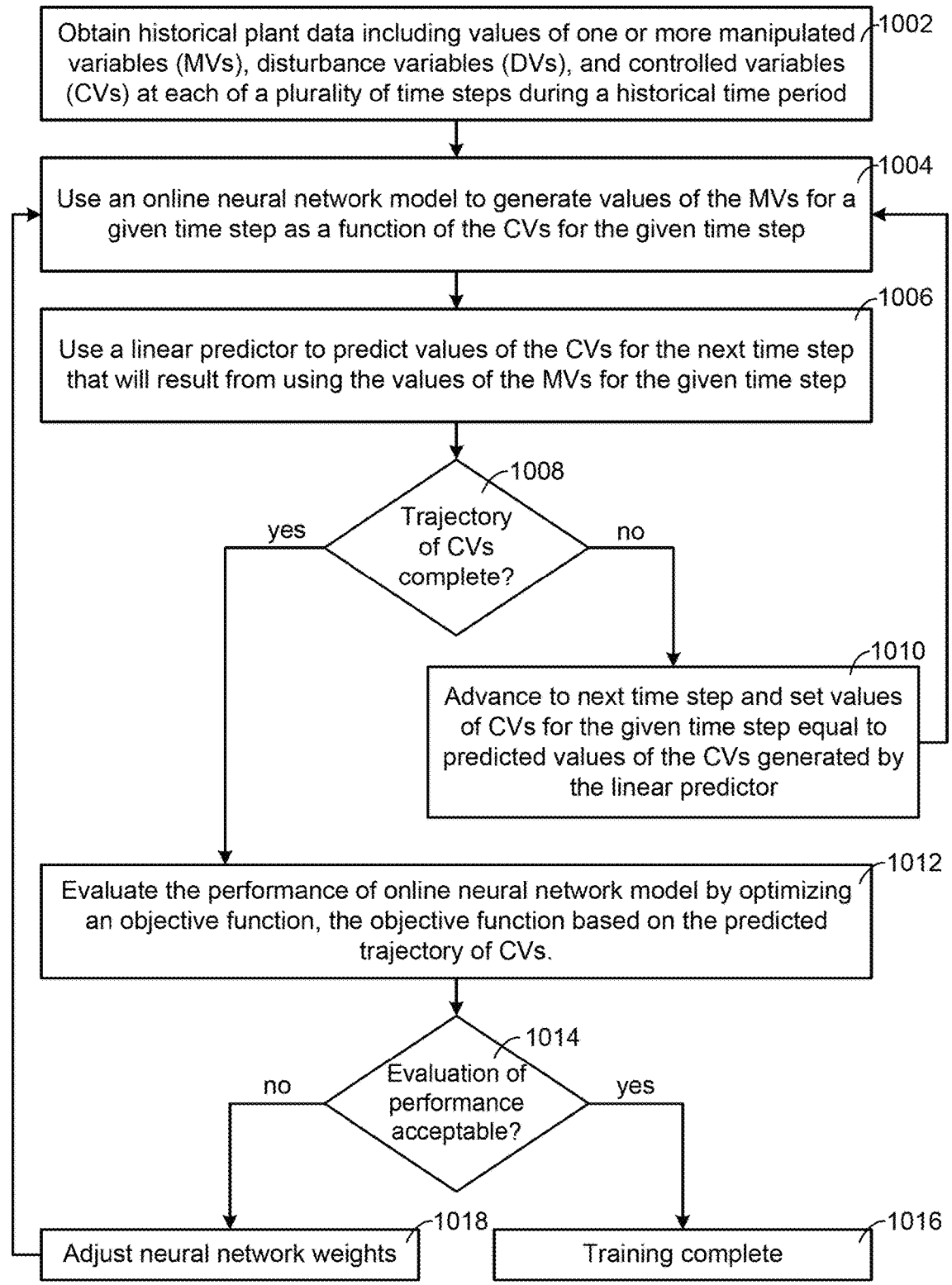
FIG. 10 is a flow diagram of a process for training an online neural network used in NNPC, which can be performed by the controller of FIG. 5B, according to some embodiments.

Referring now to FIG. 10, a process 1000 for training a neural network used in NNPC control is shown, according to some embodiments. Process 1000 may be implemented by any one or more of the control devices described herein, such as plant controller 202.

Process 1000 is shown to include obtaining historical plant data including values of one or more manipulated variables (MVs), disturbance variables (DVs), and controlled variables (CVs) at each of a plurality of time steps during a historical time period (step 1002). This step may be similar to any of the other data collecting steps described above. For example, data collector 210 receives MV, CV, and DV information from data storage 222. In some embodiments, this data is received for current state, which may refer to a single instance of an MV, CV, and DV data or an averaged episode/state data set performed to linearize the data via episode manager 212. In some embodiments, the values of the MVs and values of the CVs could replace with MV steps and CV steps throughout process 1000. This may include an additional step that calculates the MV and CV steps.

Process 1000 is shown to include using an online neural network model to generate values of the MVs for a given time step as a function of the CVs for the given time step (step 1004). In some embodiments, neural network 522 generates MV values for optimizer 404 based on CV functions (e.g., coefficient information, matrix information, etc.) provided by linear predictor 218.

Process 1000 is shown to include using an online neural network model to generate values of the MVs for a given time step as a function of the CVs for the given time step (step 1006). Linear predictor 218 may further be configured to predict the CV values for the next time step that results from the predicted CV steps generated by neural network 522. Once the trajectory of the CV's is complete, process 1000 may advance to step 1012. If the trajectory of the CV's is not complete, process 1000 may advance to next time step and set values of CVs for the given time step equal to predicted values of the CVs generated by the linear predictor (step 1010). This process is continued until decision step 1008 indicates that all CV trajectory has been completed. In some embodiments, neural network 522 is trained whenever a new linear predictor is generated. In other embodiments, neural network 522 is trained offline based on offline neural network 216.

Process 1000 is shown to include evaluating performance of the online neural network model by optimizing an objective function, the objective function based on the predicted trajectory of CVs (step 1012). In some embodiments, one or more constraints are imposed on neural network 522, and neural network 522 must output CV's that meet the constraints and satisfy the objective function. In some embodiments, the objective function may be optimized by neural network 522 such that, under given constraints, the outputs are provided to either maximize or minimize the objective function. In some embodiments, neural network 522 satisfies, optimizes, maximizes, or minimizes the objective function. This is shown by decision step 1014, which determines whether the performance is acceptable. In the event that the performance is acceptable, that training of neural network 522 is complete (step 1016). In the event that the performance is not acceptable, the weights of neural network 522 are adjusted (step 1018) and neural network 522 repeats the training process, beginning back at step 1004. In some embodiments, the trajectory of MV values could be compared against the historical data, or both the trajectories of MV values and CV values could be compared against the historical data.

In some embodiments, neural network 522 is trained to optimize an objective (e.g., the objective of the objective function for MLC 520), and the performance of neural network 522 is evaluated by determining how well neural network 522 optimizes the objective. In some embodiments, optimizing the objective is based on linear predictor 218 where linear predictor 218 stimulates the plant (e.g., system 100). The weights of neural network 522 may be adjusted (or not adjusted) based on how well the outputs of neural network 522 optimize the objective (e.g., when applied as inputs to linear predictor 218 which stimulates the plant (e.g., system 100)). In some embodiments, neural network 522 is trained to mimic or match the historical data and the performance of neural network 522 evaluated by determining how well the outputs of neural network 522 match the historical data.

While the systems and methods disclosed herein generally refer to implementations within a coker system, this is merely meant to be exemplary and should not be considered limiting. There are several different industries, systems, campuses, buildings, and structures where these systems and methods may be implemented, such as with a fluid catalytic cracker system. A fluid catalytic cracker (FCC) may convert heavy process gas oils into fuel gas, liquefied petroleum gas (LPG) products, gasoline, diesel, and/or fuel oil. In some embodiments, this is performed by combining hot regenerated catalyst (e.g., temperature at ~700° C.) with the incoming feed (e.g., temperature at ~230° C.) to produce a reaction mixture temperature in the range of 480-565° C. By adjusting the temperature of this reaction mixture, the product yields and total conversion of the FCCU can be optimized. This may be performed in the riser—a portion of the FCC where the reaction mixture temperature can be adjusted—of the FCC, wherein the parameter adjusted of the reaction mixture is the riser top temperature (RTT).

In some embodiments, the yields of the FCC are non-linear with respect to the RTT, with a flip (e.g., reversal) in the direction of the gain observed in the yield of gasoline range material as its maximum is passed. Additionally, feed qualities, catalyst condition, and other unit operating conditions may also affect how an incremental degree of RTT can change the yields. Using the systems and methods implemented above, a controller using one or more of the techniques described above (e.g., MPC, control techniques of MLC 520, control techniques of plant controller 202, etc.) will use gains calculated at every step, and control accordingly. By having the ability to recalculate gains at a step interval (e.g., every step, every several steps, every several minutes, every several hours, etc.), the controller may adjust itself to the changing gain directions and continuously push the unit towards the optimal operating region.

As referred to herein, a "plant" in control theory is the combination of a process and one or more mechanically-controlled outputs. For example, system 100 has various mechanically controlled outputs (e.g., valve 120, pump 122, etc.) and one or more control process (e.g., instructions provided by plant controller 202, etc.) and be generally referred to as a plant, in some embodiments. While petroleum refinery systems are generally described in exemplary embodiments, the control processes described herein are not limited to petroleum refinery systems (e.g., system 100) and could easily be implemented in several different systems, including building systems, well pumping systems, drilling systems, hydrocarbon industries (e.g., fluid catalytic cracking, coker use cases, etc.) and various other systems.

Configuration of Exemplary Embodiments

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of various systems (e.g., system 100, system 200, etc.) and methods as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A controller for a plant that exhibits nonlinear dynamics, the controller comprising:
   one or more processing circuits comprising one or more processors and memory storing instructions that, when executed by the one or more processors, cause the one or more processors to perform operations comprising:
   training a neural network model during an offline learning period using historical plant data representing a plurality of different historical states of the plant, wherein training the neural network model comprises:

generating a plurality of instances of a linear predictor as outputs of the neural network model, each instance of the linear predictor corresponding to one of the different historical states of the plant and defining a different linearization of the nonlinear dynamics localized at the corresponding historical state of the plant;

using the plurality of instances of the linear predictor to generate predicted values of one or more controlled variables as a function of historical values of one or more manipulated variables defined by the historical plant data; and adjusting weights of the neural network model to reduce an error between the predicted values of the one or more controlled variables and the historical values of the one or more controlled variables defined by the historical plant data;

using the neural network model during online operation of the plant to generate a new instance of the linear predictor as a function of a current state of the plant, the new instance of the linear predictor defining a linearization of the nonlinear dynamics localized at the current state of the plant; and controlling equipment that operate to affect the current state of the plant by performing a predictive control process that uses the new instance of the linear predictor to generate values of one or more manipulated variables provided as inputs to the equipment, wherein controlling the equipment comprises operating the equipment to convert one or more input products provided as inputs to the equipment into one or more output products provided as outputs of the equipment.

2. The controller of claim 1, wherein the current state of the plant comprises at least one of:
the one or more manipulated variables provided as inputs to the equipment;
the one or more controlled variables affected by operating the equipment; or
one or more disturbance variables that affect the one or more controlled variables but are not directly controlled.

3. The controller of claim 1, wherein performing the predictive control process comprises:
using the new instance of the linear predictor to generate an optimization constraint that defines a relationship between the one or more manipulated variables and the one or more controlled variables affected by operating the equipment; and
performing an optimization of an objective function subject to the optimization constraint to generate the values of the one or more manipulated variables as an output of the optimization.

4. The controller of claim 1, wherein performing the predictive control process comprises:
using the new instance of the linear predictor to train a second neural network model that determines the values of the one or more manipulated variables as a function of the current state of the plant;
providing the current state of the plant as an input to the second neural network model; and
generating the values of the one or more manipulated variables as an output of the second neural network model to optimize an objective function.

5. The controller of claim 4, wherein using the new instance of the linear predictor to train the second neural network model comprises:
using the second neural network model to generate determined values of the one or more manipulated variables as a function of a historical state of the plant defined by the historical plant data;
using the new instance of the linear predictor to predict values of the one or more controlled variables affected by operating the equipment as a function of the determined values of the one or more manipulated variables; and
adjusting weights of the second neural network model to optimize the objective function, wherein the second neural network model outputs the one or more manipulated variables based on the objective function.

6. The controller of claim 1, wherein the values of the one or more manipulated variables comprise at least one of:
time series values comprising a value for each of the one or more manipulated variables at each of a plurality of time steps; or
step values indicating amounts by which each of the one or more manipulated variables changes between time steps.

7. The controller of claim 1, the operations further comprising:
using the plurality of instances of the linear predictor to train a second neural network model that determines the values of the one or more manipulated variables as a function of the current state of the plant;
providing the current state of the plant as an input to the second neural network model; and
generating the values of the one or more manipulated variables as an output of the second neural network model to optimize an objective function.

8. A method for controlling a plant that exhibits nonlinear dynamics, the method comprising:
training a neural network model during an offline learning period using historical plant data representing a plurality of different historical states of the plant, wherein training the neural network model comprises:
generating a plurality of instances of a linear predictor as outputs of the neural network model, each instance of the linear predictor corresponding to one of the different historical states of the plant and defining a different linearization of the nonlinear dynamics localized at the corresponding historical state of the plant;
using the plurality of instances of the linear predictor to generate predicted values of one or more controlled variables as a function of historical values of one or more manipulated variables defined by the historical plant data; and
adjusting weights of the neural network model to reduce an error between the predicted values of the one or more controlled variables and the historical values of the one or more controlled variables defined by the historical plant data;
using the neural network model during online operation of the plant to generate a new instance of the linear predictor as a function of a current state of the plant, the new instance of the linear predictor defining a linearization of the nonlinear dynamics localized at the current state of the plant; and
controlling equipment that operate to affect the current state of the plant by performing a predictive control process that uses the new instance of the linear predictor to generate values of one or more manipulated variables provided as inputs to the equipment, wherein controlling the equipment comprises operating the equipment to convert one or more input products provided as inputs to the equipment into one or more output products provided as outputs of the equipment.

9. The method of claim 8, wherein the current state of the plant comprises at least one of:
the one or more manipulated variables provided as inputs to the equipment;
the one or more controlled variables affected by operating the equipment; or
one or more disturbance variables that affect the one or more controlled variables but are not directly controlled.

10. The method of claim 8, wherein performing the predictive control process comprises:
using the new instance of the linear predictor to generate an optimization constraint that defines a relationship between the one or more manipulated variables and the one or more controlled variables affected by operating the equipment; and
performing an optimization of an objective function subject to the optimization constraint to generate the values of the one or more manipulated variables as an output of the optimization.

11. The method of claim 8, wherein performing the predictive control process comprises:
using the new instance of the linear predictor to train a second neural network model that determines the values of the one or more manipulated variables as a function of the current state of the plant;
providing the current state of the plant as an input to the second neural network model; and
generating the values of the one or more manipulated variables as an output of the second neural network model to optimize an objective function.

12. The method of claim 11, wherein using the new instance of the linear predictor to train the second neural network model comprises:
using the second neural network model to generate values of the one or more manipulated variables as a function of a historical state of the plant defined by the historical plant data;
using the new instance of the linear predictor to predict values of the one or more controlled variables affected by operating the equipment as a function of the predicted values of the one or more manipulated variables; and
adjusting weights of the second neural network model to optimize the objective function, wherein the second neural network model outputs the one or more manipulated variables based on the objective function.

13. The method of claim 8, wherein the values of the one or more manipulated variables comprise at least one of:
time series values comprising a value for each of the one or more manipulated variables at each of a plurality of time steps; or
step values indicating amounts by which each of the one or more manipulated variables changes between time steps.

14. The method of claim 8, the method further comprising:
using the plurality of instances of the linear predictor to train a second neural network model that determines the values of the one or more manipulated variables as a function of the current state of the plant;
providing the current state of the plant as an input to the second neural network model; and
generating the values of the one or more manipulated variables as an output of the second neural network model to optimize an objective function.

15. A method for controlling a plant that exhibits nonlinear dynamics, the method comprising:
training a neural network model by:
providing historical plant data representing a historical state of the plant as inputs to the neural network model;
generating an instance of a linear predictor as an output of the neural network model;
using the instance of the linear predictor to generate predicted values of one or more controlled variables as a function of historical values of one or more manipulated variables defined by the historical plant data; and
adjusting weights of the neural network model to reduce an error between the predicted values of the one or more controlled variables and the historical values of the one or more controlled variables defined by the historical plant data;
obtaining a current state of the plant comprising values of one or more variables monitored or controlled by the plant;
using the neural network model to generate a new instance of the linear predictor as a function of the current state of the plant, the new instance of the linear predictor defining a linearization of the nonlinear dynamics localized at the current state of the plant;
performing a predictive control process using the new instance of the linear predictor to generate values of the one or more manipulated variables; and
controlling equipment that operate to affect the current state of the plant by providing the values of the one or more manipulated variables as inputs to the equipment, wherein controlling the equipment comprises operating the equipment to convert one or more input products provided as inputs to the equipment into one or more output products provided as outputs of the equipment.

16. The method of claim 15, wherein the current state of the plant comprises at least one of:
the one or more manipulated variables provided as inputs to the equipment;
the one or more controlled variables affected by operating the equipment; or
one or more disturbance variables that affect the one or more controlled variables but are not directly controlled.

17. The method of claim 15, wherein the values of the one or more manipulated variables comprise at least one of:
time series values comprising a value for each of the one or more manipulated variables at each of a plurality of time steps; or
step values indicating amounts by which each of the one or more manipulated variables changes between time steps.

18. The method of claim 15, wherein performing the predictive control process comprises:
using the new instance of the linear predictor to generate an optimization constraint that defines a relationship between the one or more manipulated variables and the one or more controlled variables affected by operating the equipment; and
performing an optimization of an objective function subject to the optimization constraint to generate the values of the one or more manipulated variables as an output of the optimization.

19. The method of claim 15, wherein performing the predictive control process comprises:
- using the new instance of the linear predictor to train a second neural network model that determines the values of the one or more manipulated variables as a function of the current state of the plant;
- providing the current state of the plant as an input to the second neural network model; and
- generating the values of the one or more manipulated variables as an output of the second neural network model to optimize an objective function.

20. The method of claim 15, the method further comprising:
- generating a plurality of instances of the linear predictor as outputs of the neural network model, each instance of the linear predictor corresponding to one of the different historical states of the plant and defining a different linearization of the nonlinear dynamics localized at the corresponding historical state of the plant;
- using the plurality of instances of the linear predictor to train a second neural network model that determines the values of the one or more manipulated variables as a function of the current state of the plant;
- providing the current state of the plant as an input to the second neural network model; and
- generating the values of the one or more manipulated variables as an output of the second neural network model to optimize an objective function.

* * * * *